(12) United States Patent
Clement

(10) Patent No.: US 9,039,083 B2
(45) Date of Patent: *May 26, 2015

(54) CRASH INDICATION SYSTEM FOR A RECLINING RIDE DOWN CHILD SEAT

(75) Inventor: David Clement, Colorado Springs, CO (US)

(73) Assignee: DIONO, LLC, Puyallup, WA (US)

(*) Notice: Subject to any disclaimer, the term of this patent is extended or adjusted under 35 U.S.C. 154(b) by 165 days.

This patent is subject to a terminal disclaimer.

(21) Appl. No.: 13/587,388

(22) Filed: Aug. 16, 2012

(65) Prior Publication Data

US 2012/0319442 A1    Dec. 20, 2012

Related U.S. Application Data

(63) Continuation-in-part of application No. 13/052,838, filed on Mar. 21, 2011, now Pat. No. 8,632,124.

(60) Provisional application No. 61/316,955, filed on Mar. 24, 2010.

(51) Int. Cl.
*B60N 2/28* (2006.01)
*B60N 2/427* (2006.01)
*B60N 2/42* (2006.01)

(52) U.S. Cl.
CPC ............ *B60N 2/2887* (2013.01); *B60N 2/2821* (2013.01); *B60N 2/2824* (2013.01); *B60N 2/2827* (2013.01); *B60N 2/286* (2013.01); *B60N 2/2875* (2013.01); *B60N 2/2884* (2013.01);
(Continued)

(58) Field of Classification Search
USPC ............ 297/216.11, 216.15, 216.16, 216.18, 297/217.2, 343, 318, 256.1, 256.13, 216.19
See application file for complete search history.

(56) References Cited

U.S. PATENT DOCUMENTS 4,480,870 A    11/1984   von Wimmersperg
5,366,269 A *  11/1994   Beauvais ............... 297/216.19
(Continued)

FOREIGN PATENT DOCUMENTS

DE    29817365 U1    2/1992
DE    20213665 U1    11/2002
(Continued)

OTHER PUBLICATIONS

Instructions for Baby-Safe ISOFIX Base.
(Continued)

*Primary Examiner* — David R Dunn
*Assistant Examiner* — Timothy J Brindley
(74) *Attorney, Agent, or Firm* — Stetina Brunda Garred & Brucker

(57) ABSTRACT

More specifically, the crash indication system for a child safety seat includes a seat bottom. A base is provided for supporting the seat bottom, which is slidably connected to the bases so that the seat body is movable relative to the base, between a resting position and a ride down position, a position due to a change in environmental forces. The seat body is adjustably affixed to a carriage to set a recline position. An indicator member is attached to the carriage and moves therewith to visually track and monitor the movement of the seat. When ride down of the seat occurs due to a change in forces to the seat, the indicator member moves with the sliding carriage to reflect a ride down position of the seat bottom. A ratchet connection is provided to prevent the carriage from going back to its resting position.

4 Claims, 30 Drawing Sheets

(52) U.S. Cl.
CPC .......... *B60N 2/4221* (2013.01); *B60N 2/42709* (2013.01)

(56) References Cited

U.S. PATENT DOCUMENTS

| | | | |
|---|---|---|---|
| 5,551,751 A * | 9/1996 | Sedlack et al. ............ | 297/256.13 |
| 5,722,719 A | 3/1998 | Glomstad | |
| 6,454,350 B1 | 9/2002 | Celestina-Krevh et al. | |
| 6,767,057 B2 | 7/2004 | Neelis | |
| 6,817,665 B2 | 11/2004 | Pacella et al. | |
| 6,851,753 B2 * | 2/2005 | Akaike et al. ............ | 297/344.17 |
| 6,871,908 B2 | 3/2005 | Takizawa | |
| 7,070,236 B2 * | 7/2006 | Kawashima ............ | 297/216.14 |
| 7,270,373 B2 | 9/2007 | Sakumoto | |
| 7,488,034 B2 | 2/2009 | Ohren et al. | |
| 8,632,124 B2 * | 1/2014 | Clement et al. .......... | 297/216.11 |
| 2002/0074840 A1 | 6/2002 | Nakagawa et al. | |
| 2006/0170262 A1 | 8/2006 | Gold et al. | |
| 2008/0315647 A1 | 12/2008 | Carine | |
| 2009/0026815 A1 | 1/2009 | Amesar et al. | |
| 2009/0102253 A1 | 4/2009 | Forbes et al. | |
| 2009/0256404 A1 | 10/2009 | Strong et al. | |
| 2009/0302647 A1 | 12/2009 | Przybylo et al. | |
| 2010/0007187 A1 | 1/2010 | Hutchinson et al. | |
| 2010/0032997 A1 | 2/2010 | Gold et al. | |
| 2010/0060046 A1 | 3/2010 | Vertegaal | |
| 2011/0233978 A1 | 9/2011 | Clement et al. | |

FOREIGN PATENT DOCUMENTS

| | | |
|---|---|---|
| DE | 10351753 A1 | 6/2005 |
| DE | 102004022316 A1 | 11/2005 |
| DE | 102005007262 A1 | 8/2006 |
| DE | 202007012746 U1 | 12/2007 |
| EP | 1757484 A2 | 2/2007 |
| EP | 2230125 A1 | 9/2010 |
| FR | 2866844 A1 | 9/2005 |
| FR | 2870498 A1 | 11/2005 |
| GB | 2425463 A | 11/2006 |

OTHER PUBLICATIONS

Instructions for ISOFIX—Adapter.
Instructions for use MAXI-COSI Car Seats.
European Patent Office, Examination Report for European Application No. 12180893.5, Nov. 5, 2012, 4 Pages.

* cited by examiner

CRASH INDICATION SYSTEM FOR A RECLINING RIDE DOWN CHILD SEAT

CROSS-REFERENCE TO RELATED APPLICATIONS

This application is a continuation-in-part of and claims priority from earlier filed U.S. non-provisional patent application Ser. No. 13/052,838, filed Mar. 21, 2011, which is related to and claims priority from earlier U.S. provisional patent application Ser. No. 61/316,955, filed Mar. 24, 2010, the entire contents thereof is incorporated herein by reference.

BACKGROUND OF THE INVENTION

The present invention relates generally to child restraint and safety devices. More specifically, the present invention relates to child restraint and safety (CRS) devices, such as child car seats and booster seats. The present invention further relates to a crash indication system that is used for such car seats.

In the prior art, child safety restraints, such as those for use in a vehicle are very well known in the art. Such restraints are secured to an existing vehicle car seat. The child is then secured to the restraint to secure the child during travel. These prior art restraints are typically in the form of a booster seat or a child car seat. A booster seat is commonly known as a seat that attached to an existing vehicle seat where the seat uses the existing belt restraint system of the vehicle. Such a booster seat is commonly used for older children. Also, a child restraint may be in the form of a child car seat, which is secured itself directly to the vehicle, such as by the car's seat belt system or directly to the frame of the vehicle using hooks, and other attachment mechanisms and systems. For ease of discussion, child car seats and booster seats will collectively be referred to as "child car seats".

Many countries around the world have standardized how a child car seat is to be secured to a vehicle seat and how movement of the seat is controlled in the event of an impact to improve the overall safety of children's car seats in vehicles.

It is well known in the art that child seats must be secured to a supporting vehicle seat in some fashion so that it does not move around the vehicle during use. A system called Lower Anchors and Tethers for Children (LATCH) is commonly used for this purpose, which includes two lower anchor attachments and a top tether. The term is often used generically to refer only to the pair of fixed lower loop shaped anchors built into the bight or crack between the seat back and seat cushion. The LATCH system was originally called ISO-FIX, which is a term still used in Europe. Canada, employs a similar standard called the Universal Anchorage System (UAS). It has also been called the Universal Child Safety Seat System or UCSSS. All of foregoing systems refer to the same universal anchorages that started to appear on car models starting in about the year 2000. These are now required by law in the United States for almost all model year 2003 and later vehicles.

When a LATCH system is used, existing seatbelts are no longer necessary to install the car seat because the child car seat is mounted directly to the vehicle via the metal loops using webbing or a "rigid" connector. The child car seat or booster seat includes releasable clips to engage with the metal loops of the LATCH system. This makes it easier to install car seats safely, and to make it more universal among car seats and vehicles. Compatible corresponding LATCH coupling systems are now commonly found on child car seat bases, rear-facing, front-facing and combination booster seats and those that have an internal harness. Further details of the LATCH system need not be discussed in further detail as it is so well known in the art. It should also be understood that the LATCH system, although a preferred method, is just one way to secure a child seat to a supporting vehicle seat.

In light of the requirement to fixedly secure a child seat to a supporting vehicle seat, there are challenges in the industry for control over the movement of the seat itself in the event of an impact to the vehicle, such as during an accident. More specifically, there is a concern as to movement of the child seat in such conditions because excessive forces exerted can cause injury to a child in the child car seat.

For example, when a child car seat is fixedly connected to a vehicle, an accident may cause impact forces that can cause very sudden and abrupt movements to the child, such as can occur when a vehicle is abruptly stopping. It has been shown that these sudden and abrupt movements to a child in a child car seat is more likely to injure a child than movements that are less abrupt. For example, sudden stopping a vehicle and the sudden stopping of forces to a child car seat is more likely to injure a child than a where such forces are stopped in a slower or decelerated fashion.

In view of this, some child car seats are designed with features that in some way decelerate the child's movement relative to the movement of the vehicle. This helps reduce resulting impact forces to the child and helps prevent injuries to a child in the child car seat. This deceleration is often called "ride down" where some type of load limiting is provided to manage the deceleration rate of the child car seat.

Load limiting for "ride down" in child car seats can be provided in many different ways. For example, the seat belt harness, at different locations, can be configured to include some type of elastic or spring member to help gently slow down the deceleration of the child car seat. This is very similar to fall restraint technology used for safety harnesses for working in a construction site. Also, child car seats can also include various types of spring biasing members, such as springs, foam and the like, within the construction of the child car seat itself to assist in absorbing and limiting the load to improve safety for the child.

There have also been attempts in the prior art to provide child car seats that have a portion that moves relative to another portion of the seat where that relative movement is load limited while also providing the ability to recline the seat. For example, U.S. Pat. No. 5,551,751, issued to Sedlack, et al., teaches such a ride down child car seat where the car seat rides along a curvilinear track in the even of an impact. Such riding is controlled by a spring to help decelerate the movement of the load of the child car seat. In this seat, depending on whether the seat is forward facing or rear facing, the leading edge of the seat will move upwardly along the curvilinear track. This device suffers from disadvantages of being difficult to incorporate recline adjustability with the curvilinear ride down configuration disclosed. Also, curved movement of the seat is required, which is undesirable because this adds complexity and further directions of force.

When some type of ride down of the child car seat has occurred, there is typically an event that has caused that ride down. For example, a crash or other impact to the vehicle, into which the child seat is installed, may have occurred to trigger ride down. A child car seat is typically rendered unusable after an accident or other impact because the ride down action of the seat because certain components, such as the elastic or spring member, has been strained during the ride down. As a result, that component is not well suited for handing subsequent ride down events. Therefore, the child seat cannot be reused after an accident has occurred. It is important that the person in care of the seat knows that the seat has been involved in a crash and should not be used again.

In view of the above, there is a need for a child car seat that includes a ride down capability while also being able to provide recline angle adjustment for further comfort of the child without sacrificing safety of the child. There is a also a desire to provide a linear movement of the seat for load limiting ride down capability for added reliability and reduction of force and movement applied to the child to reduce injuries in the case of an accident. There is a further need for a crash indication system for a ride down car seat so it is clear that the seat should not be used after such a crash.

SUMMARY OF THE INVENTION

The present invention preserves the advantages of prior art child restraint devices, such as child seats and booster seats, and crash indication systems therefor. In addition, it provides new advantages not found in currently available devices and systems and overcomes many disadvantages of such currently available devices and systems.

As mentioned above, there is a desire to limit the load of a child car seat and help it decelerate for "ride down" to help minimize the effects of a sudden stop and prevent resultant injuries to a child. There is a need to provide clear indication that the seat has been involved in an accident and that the integrity of the seat has been compromised and should not be used again.

The invention is generally directed to a novel and unique crash indication system for a child safety seat. The seat itself includes a seat body having a seat bottom and a seat back.

More specifically, the crash indication system for a child safety seat includes a seat body having a seat bottom. A base is provided for supporting the seat body with the base positioned below the seat bottom. The seat bottom is slidably connected to the bases so that the seat body is movable relative to the base, between a resting position and a ride down position, which is defined as a position in which there has been a resulting change in location of the seat bottom caused by a change in environmental forces. A carriage, with a number of notches therein, is slidably connected to the base. A rod is connected to the seat bottom of the seat body where the rod is selectively placeable in one of the of notches. Location of the rods in one of the plurality of notches sets a recline position for the seat body in a resting position. An indicator member is attached to the carriage and moves therewith to visually track and monitor the movement of the seat. When ride down of the seat occurs due to a change in forces to the seat, the indicator member moves with the carriage to reflect a ride down position of the seat bottom.

It is therefore an object of the present invention to provide a crash indication system for a child safety seat that provides ride down deceleration in the event of an accident or other high force situations that could harm the child.

Another object of the present invention is to provide a crash indication system for a child safety seat that visually represents the crash status of the seat.

A further object of the present invention is to provide a crash indication system for a child safety seat that permanently indicates the crash status of the seat.

Another object of the present invention is to provide a crash indication system for a child safety seat that shows that its integrity has been compromised and should not be used again.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
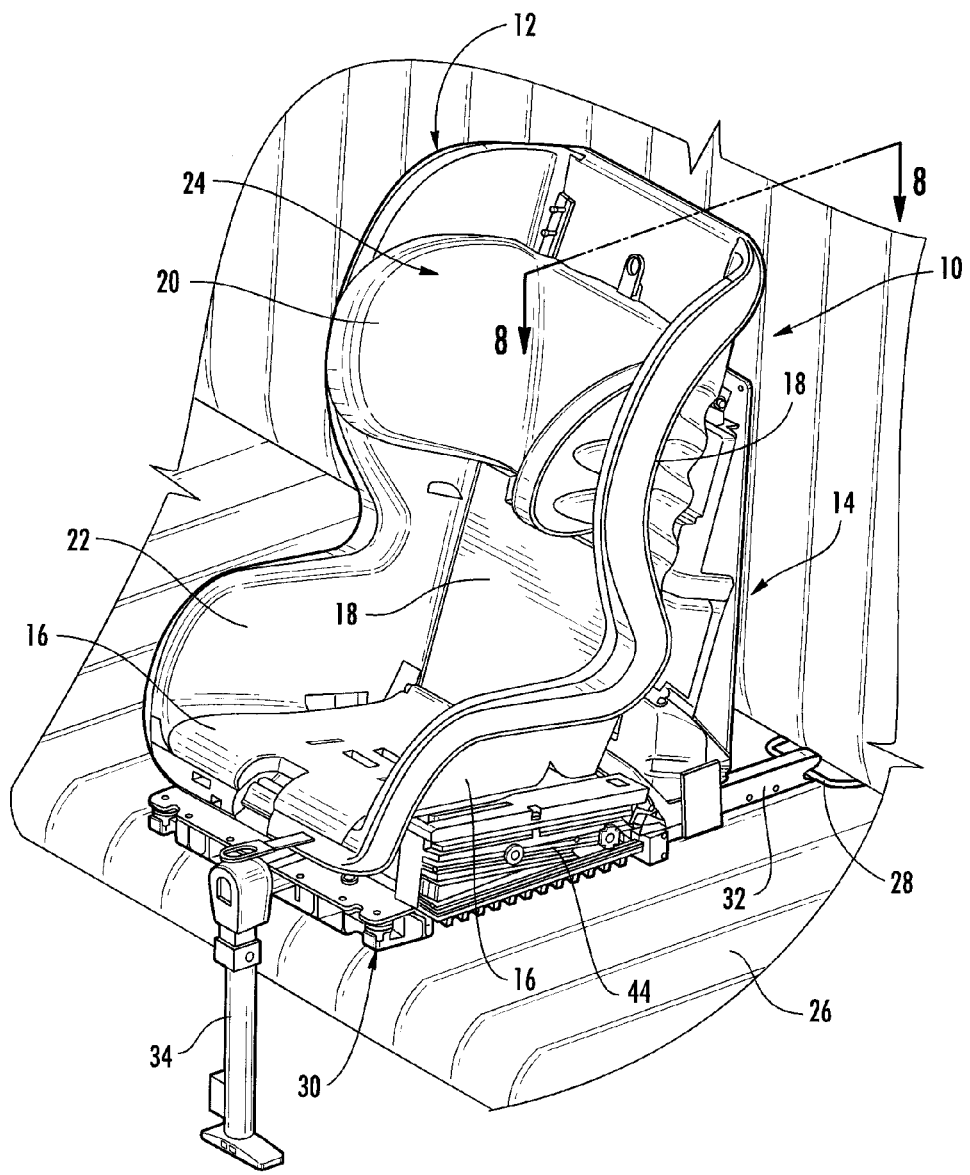
FIG. 1 is a front perspective view of the child safety seat of the present invention.

The child safety seat 10 of the present invention uniquely provides both ride down deceleration with recline adjustment of the seat body, generally referred to as 12. Referring first to FIGS. 1-4, the general configuration of the child safety seat 10 of the present invention is shown. More specifically, the child safety seat 10 includes a seat body 12 that is slidably mounted to a base 14. Details of the sliding interconnection thereof will be described in detail below. The seat body 12 includes a seat bottom 16 and a seat back 18, which are preferably integrally formed with each other. Various padding 20 and armrests 22 are preferably provided for added comfort of the child (not shown). The headrest 24 may be adjustable for even further comfort, customization and safety.

The seat body 12 and base are collectively secured to a vehicle car seat 26. For example, the present invention can be affixed to a vehicle's LATCH system 28. In this example, an ISOFIX type tray 30 may be provided to support the seat body 12 and base 14. The ISOFIX tray 30 includes the required anchor members 32 for securely interconnecting to the metal loops 28 of a vehicle's LATCH system. Thus, the seat body 12, base 14 and ISOFIX tray 30 can be collectively installed and removed from attachment to a vehicle's LATCH system 28. Of course, it is possible (although not shown) that lower anchor couplings 32 may be connected directly to the base 14 for interconnection to the vehicle's LATCH loops 28. The use of a supporting tray 30 is more convenient, also helps prevent damage to the vehicle seat 26 and can help with further adjustment by use of a height adjustment post 34. If desired, the seat body 12 and base 14 can be integrated into the construction of the ISOFIX tray 30 to provide a completely unitary construction.

Figure 2:
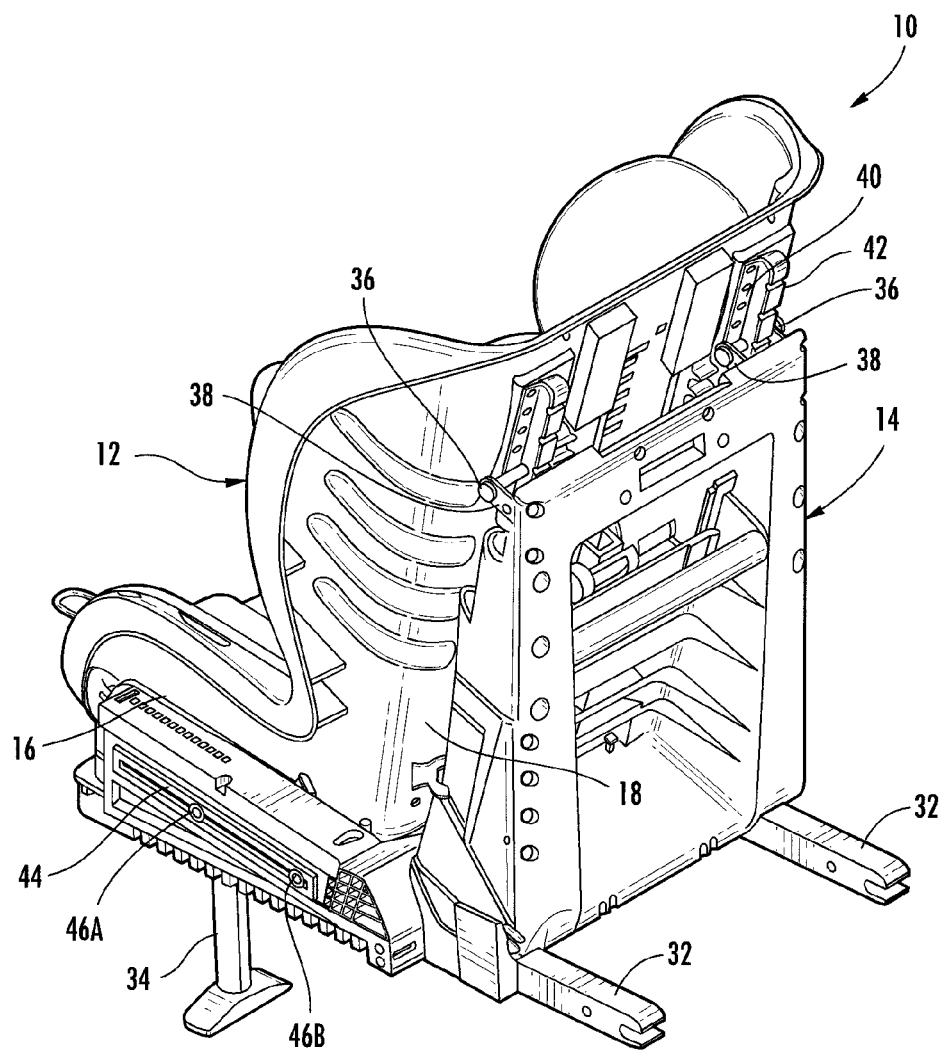
FIG. 2 is a rear perspective view of the child safety seat of FIG. 1.
Figure 3:
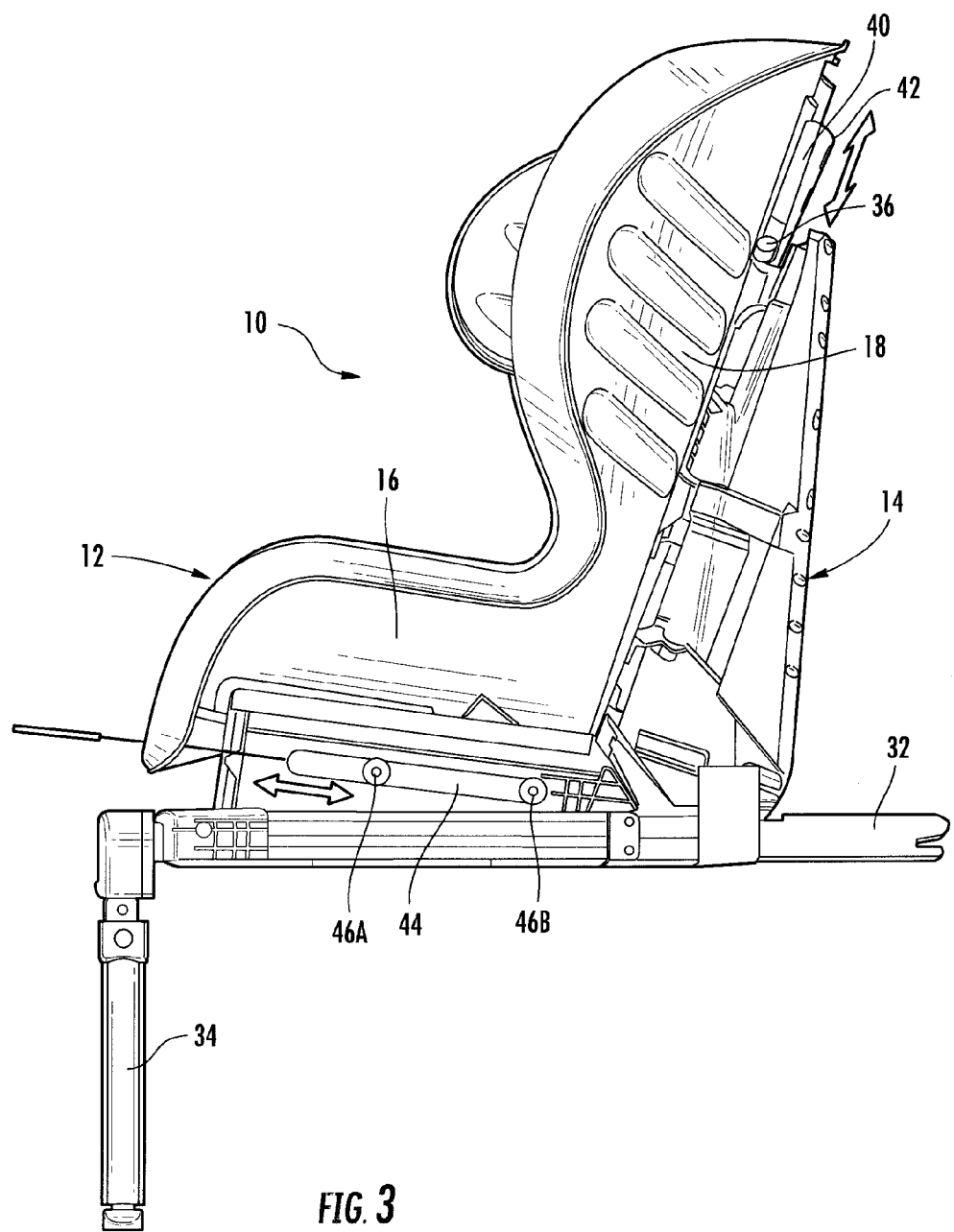
FIG. 3 is a side elevational view of the child safety seat of FIG. 1 showing the seat body at rest.
Figure 4:
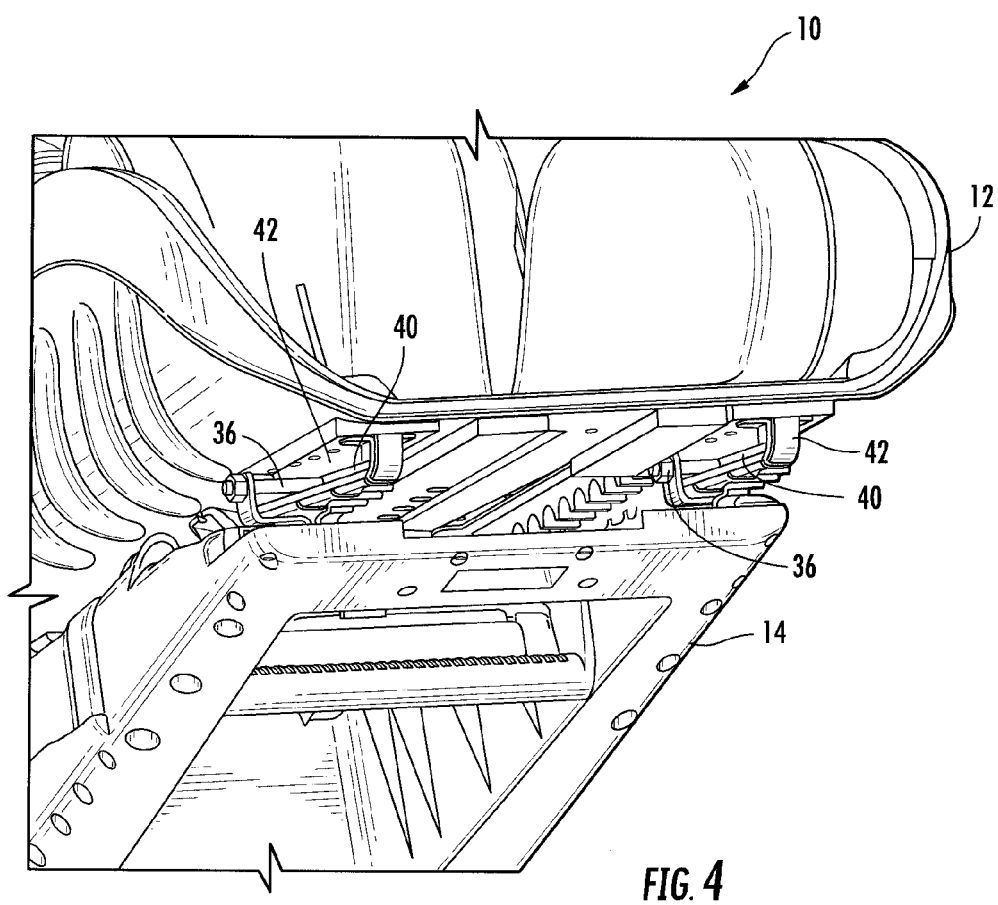
FIG. 4 is a top perspective view of the child safety seat of FIG. 1 illustrating the slidable interconnection of the seat back to a second portion of the base.

FIG. 2 shows a rear perspective view of the child safety seat 10 of the present invention with the vehicle seat 26 removed for illustrating purposes. In this view, along with FIGS. 3 and 4, details of the sliding track system of the present invention is shown. More specifically, transverse pins 36 are mounted to an upper portion of the base 14 using a bracket 38 and is configured to slidably reside in a slot 40 in a flange 42 mounted on the back of the seat body 12. A bottom portion 52 of the base 14 includes a slot 44 to receive outwardly emanating pins 46A and 46B from the sides of a sliding carriage 48 that resides in the seat bottom 16 of the seat body 12.

Preferably, the foregoing top and bottom sliding interconnections are provided on both sides of the seat body 12 and base to provide evenly distributed and balanced sliding of the seat body 12 relative to the base 14. The sliding interconnections at the top and bottom of the seat body 12 and base define the extent of relative travel of the seat body 12 relative to the base 14.

Figure 5:
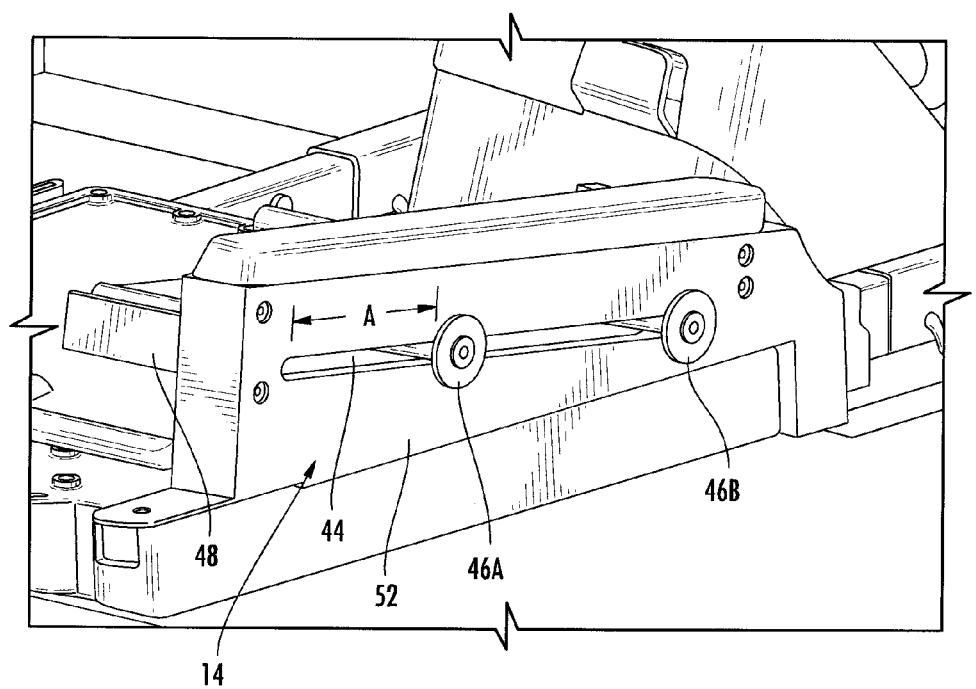
FIG. 5 is a close-up perspective view of the child safety seat of FIG. 1 illustrating the slidable interconnection of the seat bottom to a first portion of the base.

FIGS. 5-13 illustrate the recline adjustment capability of the child safety seat 10 of the present invention. FIG. 5 shows a perspective view of the bottom portion 52 of the base 14 with the seat body 10 removed for illustration purposes. A sliding cassette member (or carriage) 48 is provided inside the bottom portion 52 of the base 14 to support the seat body 12, namely, at the seat bottom 16. As will be discussed in detail in connection with FIGS. 8 and 10, a cross-member tube 50 is attached to the seat bottom 16 of seat body 12 to adjustably connect to the sliding cassette member 48. The cross-member tube 50 provides a bottom pivot point for the seat body 12 when moving relative to the base 14 and during ride down deceleration.

Figure 6:
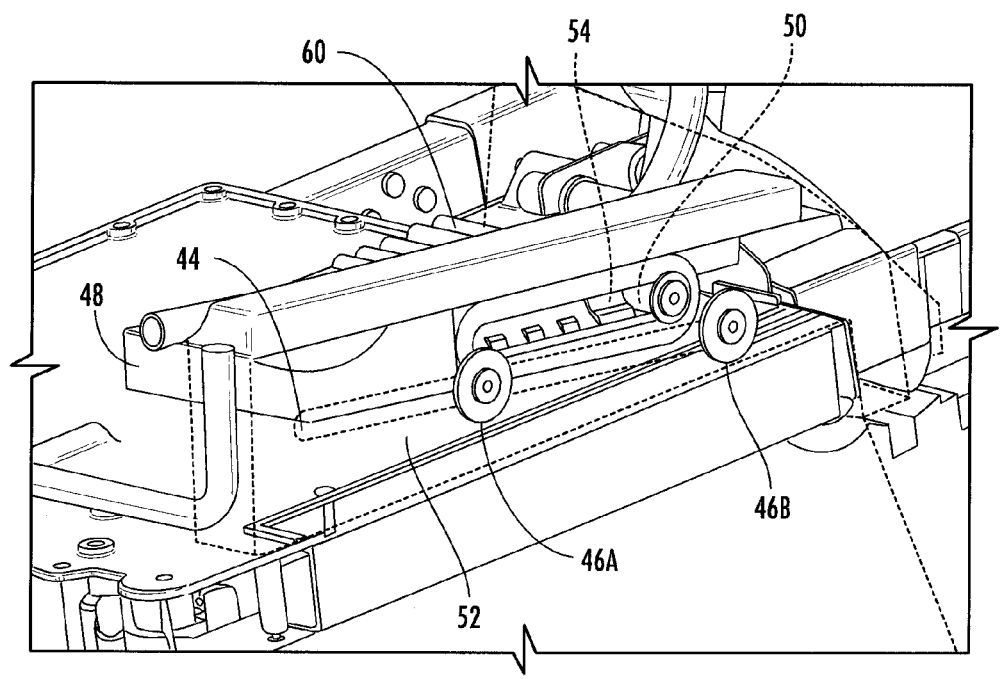
FIG. 6 is a close-up partially broken away view of the slidable interconnection of FIG. 5.
Figure 10:
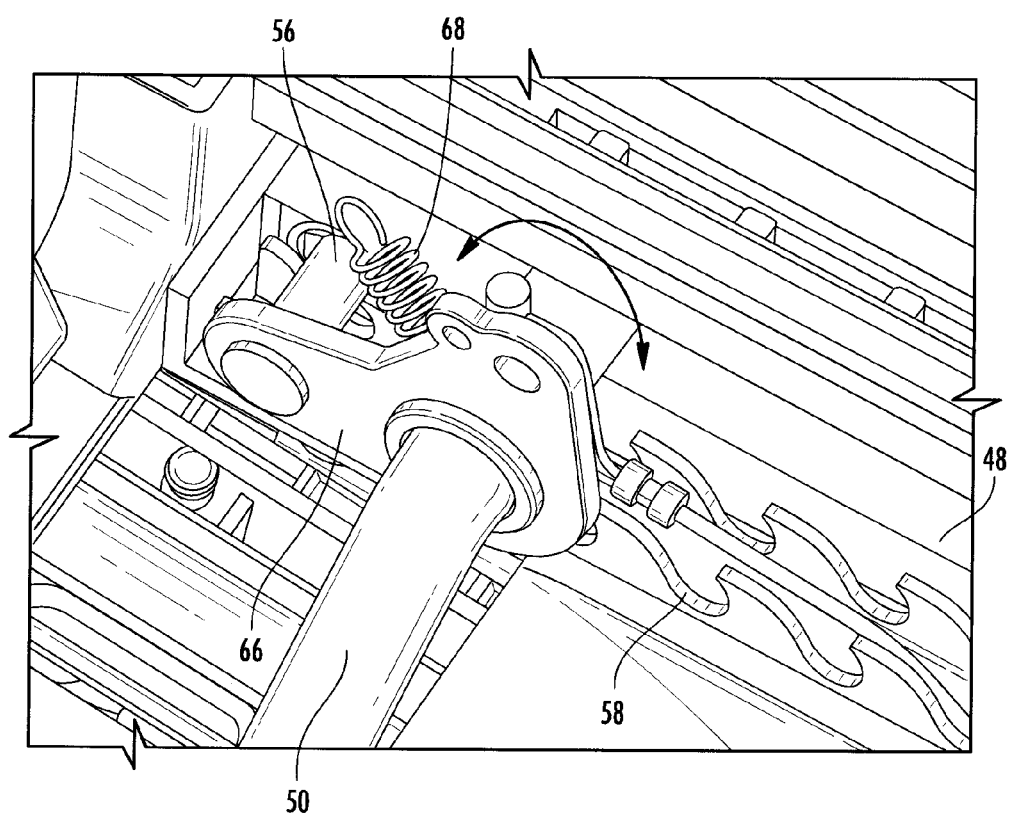
FIG. 10 is a close-up perspective view of the locking pawl structure for setting the recline angle of the seat body.

FIG. 6 shows a partial fragmentary view where the sliding cassette 48 itself includes a slot 54 to receive a pawl pin 56, as best seen in FIG. 10, to set the recline angle, namely the set angle of the seat body 12 relative to the base 12. The free end of tube 50 slides in slot 54. Therefore, the pawl pin 56 is set to a desired fixed location in one of the teeth 58 in the cassette 48 to set the recline angle while the movement of the pins 46A and 46B of the cassette 48 in the slot 44 of the lower portion 52 of the base 14 define the travel of the ride down of the seat 10 in the case of an accident. Further details of adjustment of the pawl pin 56 will be discussed below.

Figure 7:
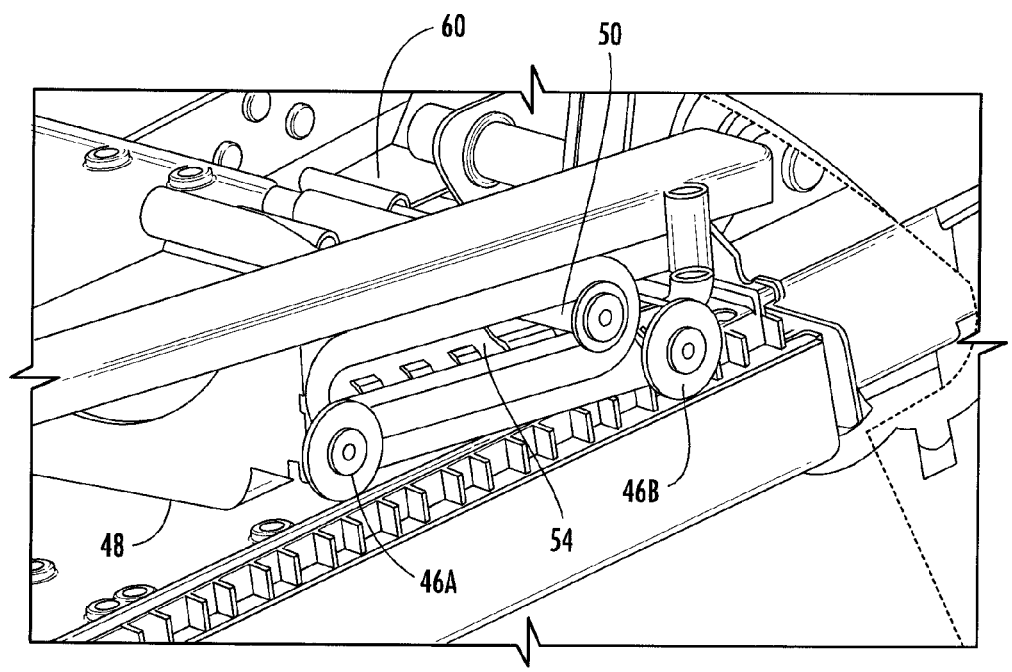
FIG. 7 is a close-up view of the slidable interconnection of FIG. 5 with outer housing removed for illustration purposes.

As will be described in connection with FIG. 8, a ride down dampening material 60 is connected between the base 14 and the carriage 48, which is connected to the seat bottom 16, to effectuate dampened ride down deceleration. FIG. 7 is a further view of the base 14 with its housing removed for illustration purposes. Thus, the cassette 48 includes its own set of pins 46A and 46B to define travel of the seat 10 during ride down while the cassette slot 54 defines the extent of recline adjustment of the seat 10. Both of these functions are unique carried out by the present invention in a single device.

Figure 8:
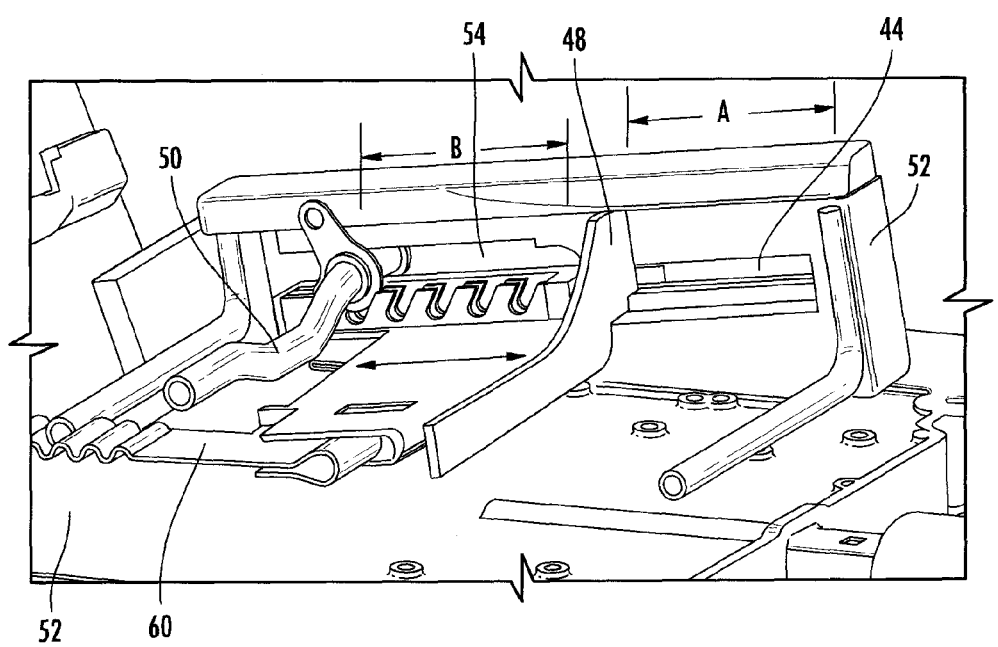
FIG. 8 is a perspective view of the ratcheted sliding carriage of the present invention for recline angle adjustment of the seat body relative to the base.

FIG. 8 is an opposite perspective view using a cross-section through the line 8-8 of FIG. 1 that generally shows the relative locations of the cassette 48 and how its pins 46A and 46B travel in a slot 44 in the lower portion 52 of the base 14. The extent of travel of the cassette 48 for ride down is defined by distance "A" while the extent of the distance of travel of the pawl pin 56, as best seen in FIG. 10, within the cassette slot 44 to define extent of recline adjustment is defined by distance "B". Distances A and B can be any distance but are preferably the same, such as 90 mm. FIG. 8 further shows the use of a dampening material 60 that is affixed to the bottom portion 52 of the base 14 at a first end and to the cassette 48 at the other end. FIG. 8 shows these parts as floating because of the nature of the partial cross-sectional view taken. It should be understood that the dampening ride down material 60 is securely connected to the base 14 at one end and securely connected to the cassette 48 at its opposing end. Further details of the construction of the dampening ride down material 60 will be discussed in connection with FIGS. 16-18.

Figure 9:
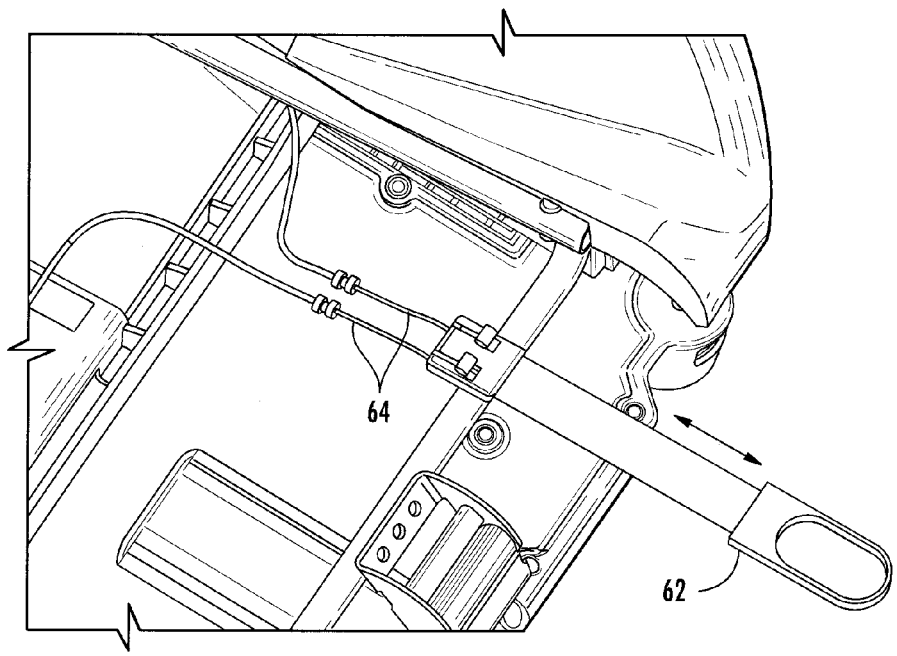
FIG. 9 is a perspective view of the pull tab for permitting adjustment of the recline angle of the seat body.

It is preferred that the recline adjustment of the seat body 12 relative to the base 14 be as easy as possible. In FIG. 9, a pull-tab 62 is provided on the free end of a pair of cables 64, which are routed to respective cassette locking pawl members 56 on opposing sides of the seat body 12. It should be noted that the cassette 48 is preferably the width of the seat bottom 16 so that pins 46A and 46B emanating therefrom on each side slide respectively within two slots 44 in the bottom portion 52 of the base 14. The figures herein show one side of this construction but it should be understood that the opposing side is constructed in the same fashion and operates in the same way.

FIG. 10 shows a close-up view of the locking pawl configuration for releasably engaging with a row of teeth 58 on the opposing lateral sides of the sliding cassette 48. When at rest, the dampening ride down material 60 maintains the cassette 48 in a fully rearward position, as seen in FIGS. 1-3, 5 and 6, for example. A plate 66 with a pawl pin 56 is rotatingly spring-biased in a counterclockwise direction using spring 68 so that the pawl pin 56 on the pawl plate 66 resides in a selected tooth 58 on the edge of the cassette 48. Pulling on the pull-tab 62 against the forces of the spring 68 causes the pawl plate 66 to rotate in a clockwise direction to cause the pawl pin 56 to lift out of a selected tooth 58 so that the seat bottom 16, via its cross-member tube 50, can slide within the cassette slot 54. Thus, when the pull-tab 62 is being pulled, the seat body 12 can be pulled or pushed within the range of travel in the cassette slot 54 to a desired recline angle of the entire seat body relative to the base. When the desired location is reached, the pull-tab 62 is simply released and the pawl pin 56, with the forces of the spring 68, engages with the closest tooth 58 to set the recline angle of the seat body 10 relative to the base 14.

As the seat body 12 reclines further, the more pin 36 slides upwardly along the slot 40. The free ends of the cross-member tube 50 also track within slot 54 to control movement of the seat in two locations. It should be noted that movement of the pin 36 in the slot 40 at the top of the seat and the free ends of tubes 50 within its slot 54 and movement of pins 46A and 46B in slot 44 are linear in nature not curved. This ensures smooth and controlled movement of the seat body 12.

Figure 11:
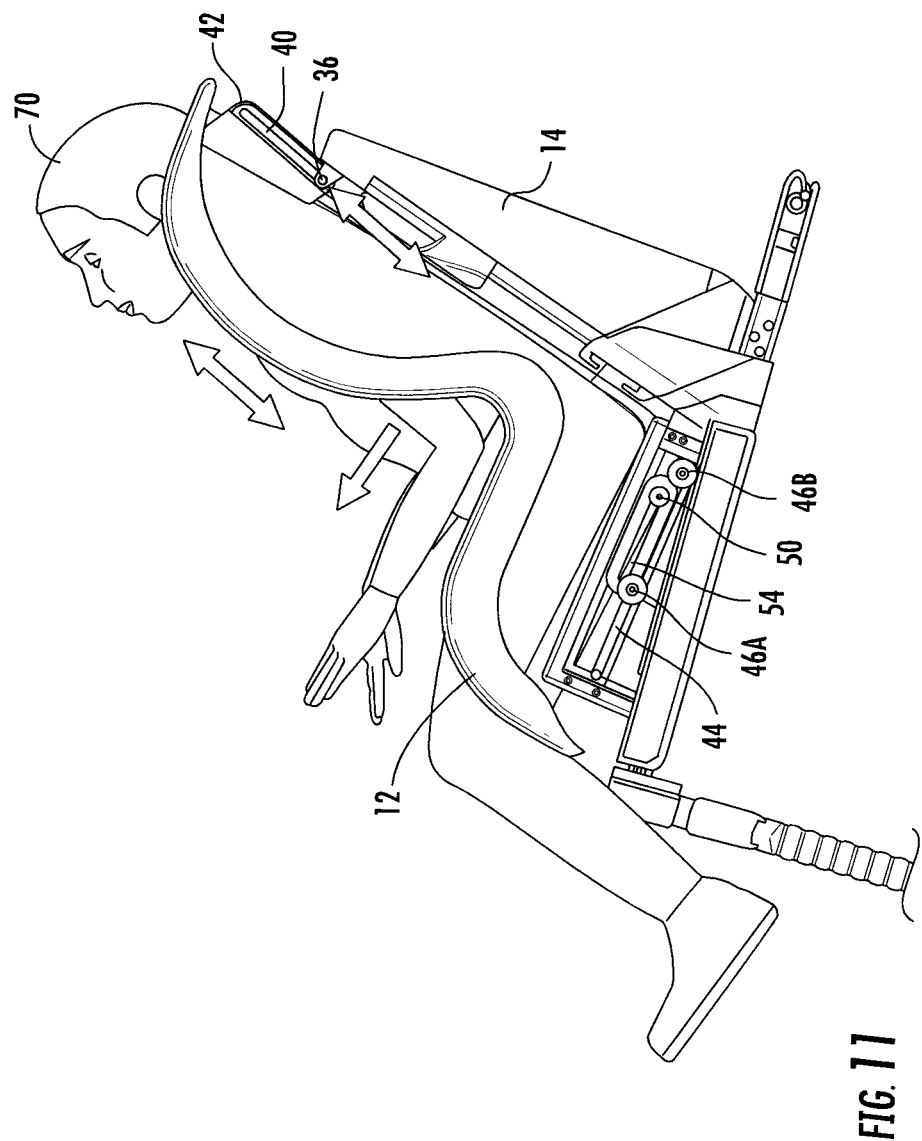
FIG. 11 is a side view of the present invention with the seat adjusted to a most upright recline position.
Figure 12:
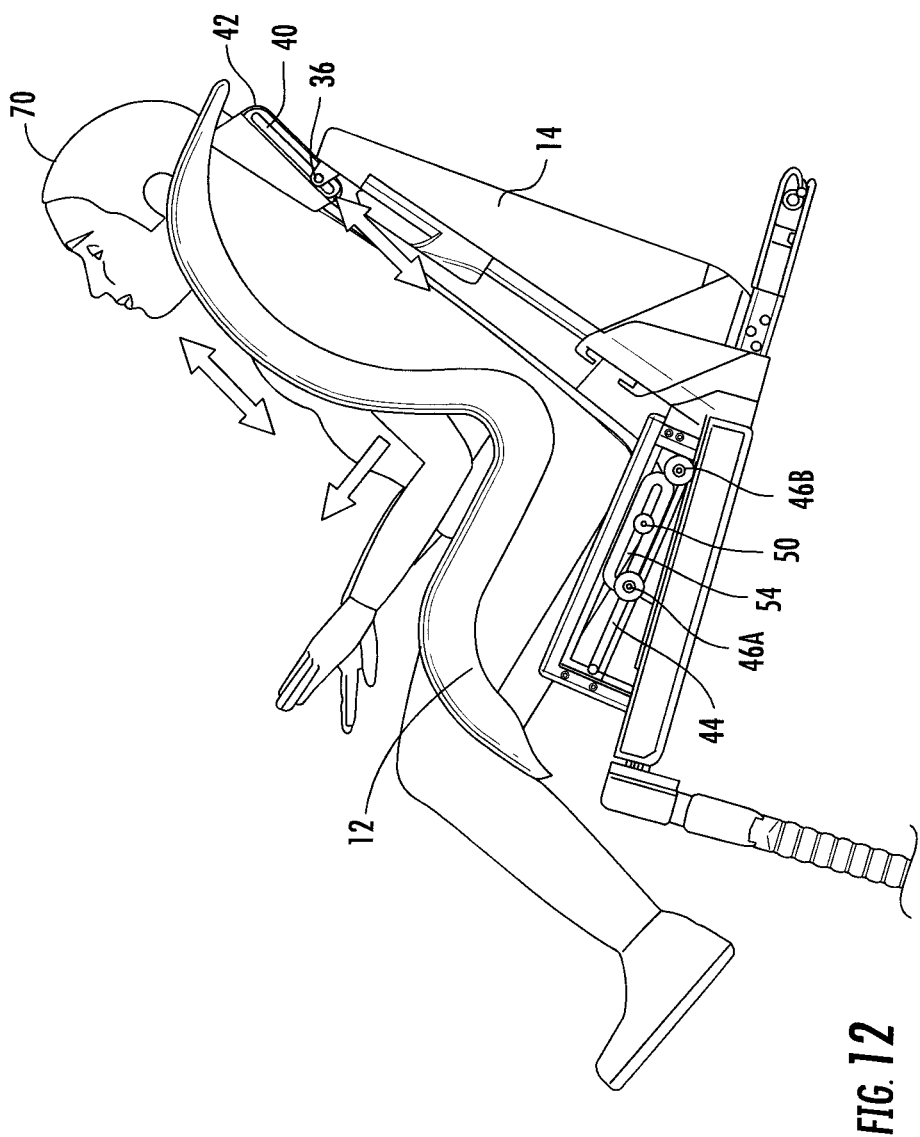
FIG. 12 is a side view of the present invention with the seat adjusted to a middle recline position.
Figure 13:
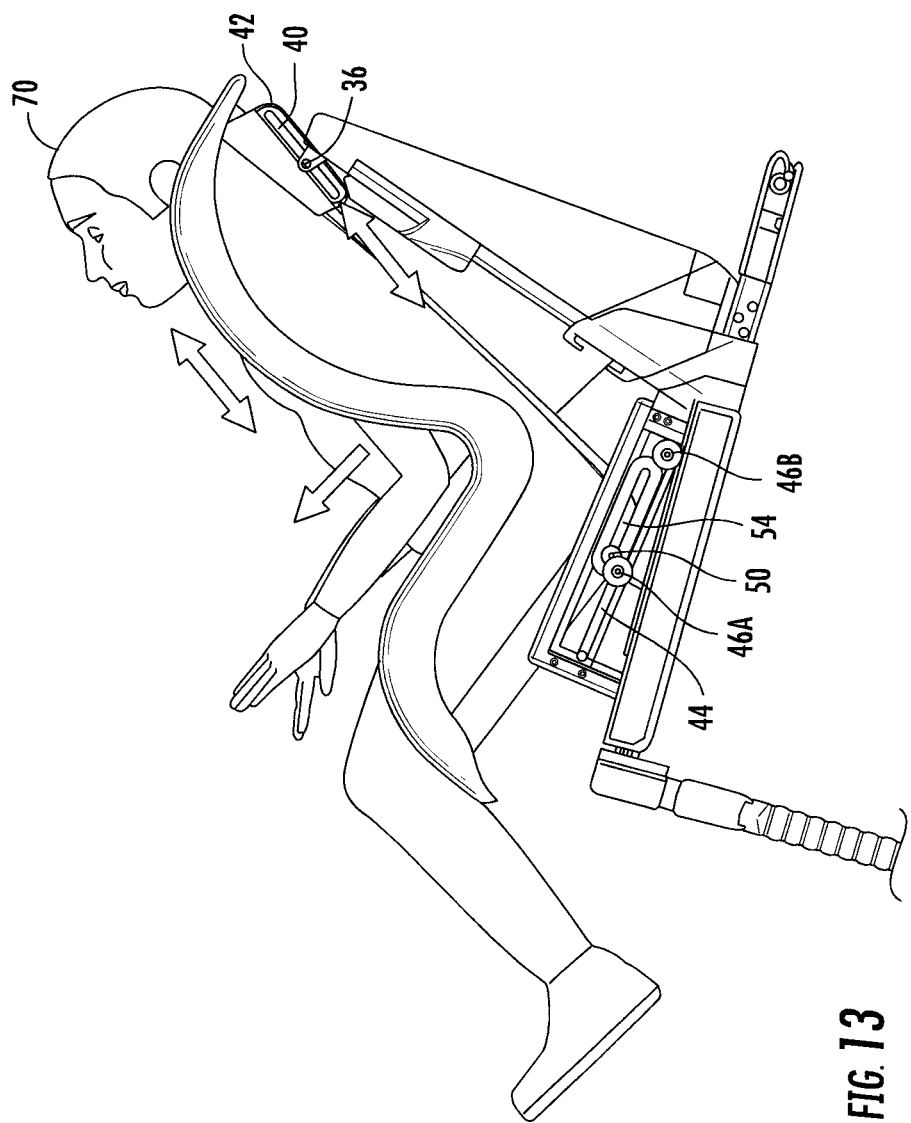
FIG. 13 is a side view of the present invention with the seat adjusted to a maximum recline position.

FIGS. 11-13 show examples of the range of adjustment of the recline angle of the seat body 12. The most upright recline position is seen in FIG. 11, which would correspond to the leftmost tooth 58 in FIG. 8, for example. It is also noted that the pin 36 mounted to the upper portion of the base 14, that engages with the slot 40 at the rear of the seat back 18, is located at the bottom of that slot 40. FIG. 12 shows a middle recline position where the pull tab 62 has been pulled and the seat bottom 16 adjusted so that the pawl pin 56 engages, for example, the third or fourth tooth 58 from the left, as seen in FIG. 8. When the pull-tab 62 is released at this middle location, the seat body 12 will be set at such a middle recline angle. As can be seen at the top of the seat body 12 and upper portion of the base 14, the pin 36 resides in a more middle location in the slot 40 at the top of the seat body 12. Still further, FIG. 13 shows a maximum recline position where the pawl pin 56 is engaged with the rightmost tooth 58, as illustrated in FIG. 8. Thus, the cross-member tube 50 can travel a distance B within the cassette slot 54. It should be noted that the pin 36 in the slot 40 at the top of the seat back is not at the end of the opposite end of the slot 40 because the slot 40 must still accommodate for even further travel of the pin 36 in the slot 40 in the case of ride down deceleration.

As far as the location of cassette 48, it should be noted that in the maximum recline position of FIG. 13, the distance A for travel of the cassette 48 has not yet be effectuated because the cassette 48 only travels when ride down deceleration occurs in the case of an accident. Therefore, the present invention provides additional travel distance in the lower slot 44 in the base 14 and the upper slot 40 on the seat back 18 to accommodate for potential further ride down travel of the seat body 12.

Figure 16:
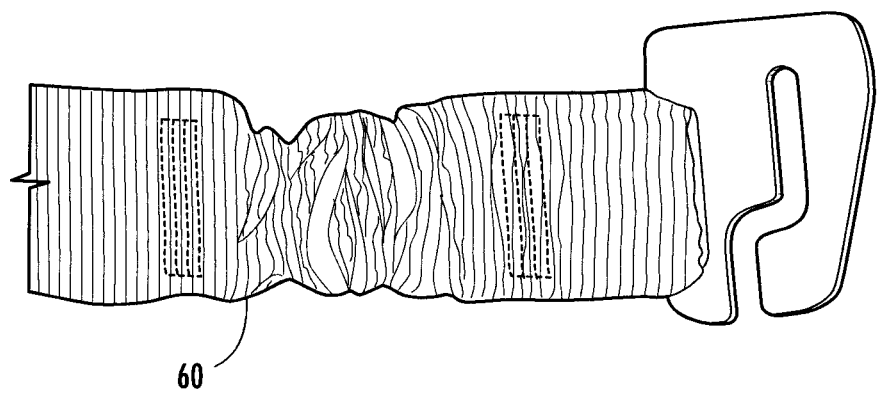
FIG. 16 is a plan view of preferred dampening material used in the present invention when in a contracted at rest condition.
Figure 17:
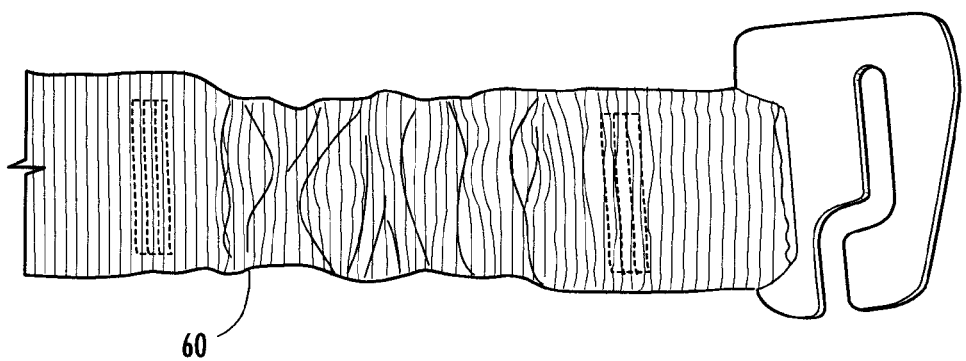
FIG. 17 is a plan view of the preferred dampening material used in the present invention when in an extended or stretched condition representing a ride down seat dampening condition.

The sliding cassette 48 is spring-biased in a rearward direction by the ride down element, which is; preferably a partially oriented yarn (POY) 60 but it can be other types of spring-biasing material. The ride down element 60 is shown in FIG. 8, as installed and also in FIGS. 16 and 17 representationally. When at rest and not in an accident force-inducing environment, the sliding cassette 48 is located at the position seen in FIG. 11 or FIG. 13 or some point therebetween, such as in FIG. 12. Once of these positions is during normal use of the child car seat 10 of the present invention.

Figure 14:
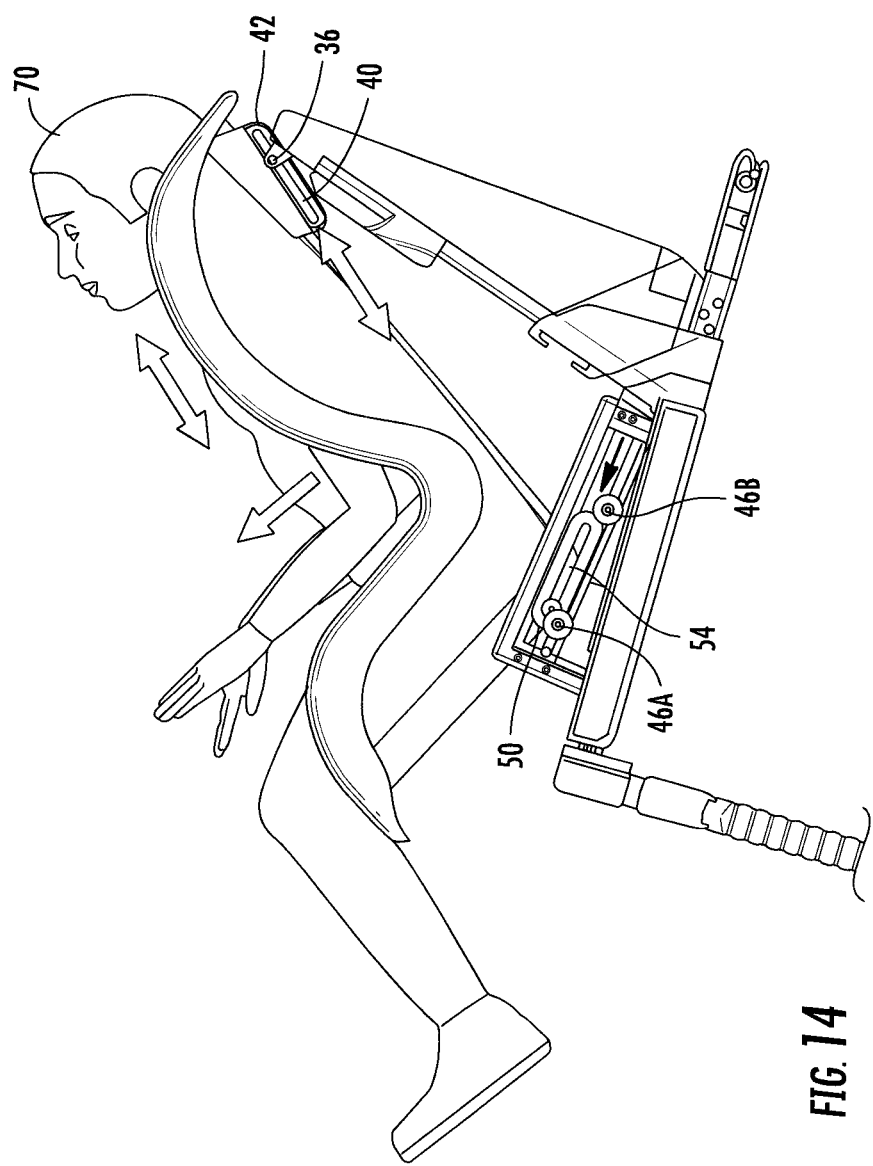
FIG. 14 is a side view of the present invention in the process of ride down and engagement of the dampening member.
Figure 15:
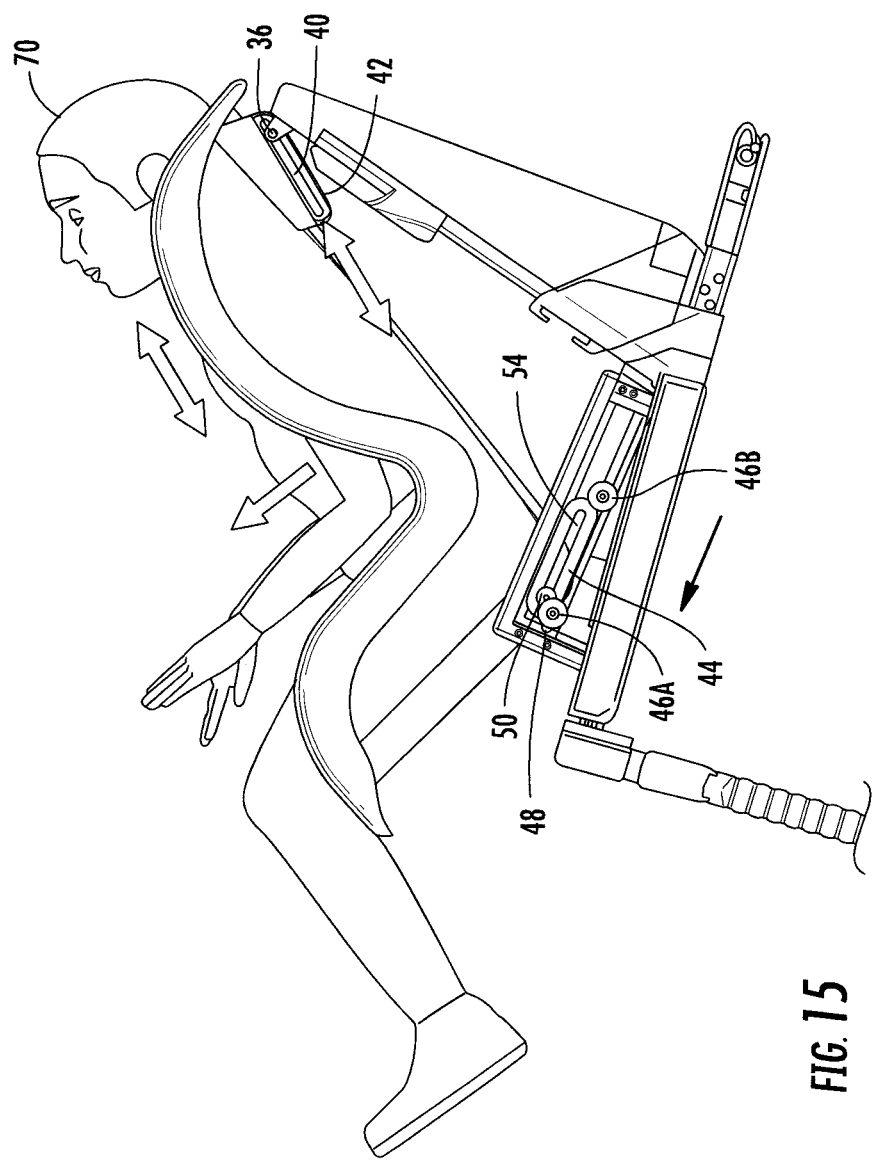
FIG. 15 is a side view of the present invention at maximum ride down for dampening.

The ride down element 60 maintains the cassette 48 in a rearward position. The base 14 is fixed to the vehicle 26, such as by the LATCH system 28 discussed above. When a forward force is exerted on the seat 12, the base 14 remains fixed to the vehicle. If the force exerted exceeds the force of the ride down element 60, the sliding cassette 48 will begin to slide forward against the forces of the ride down element 60, as can be seen in FIG. 14. At this point, it should be noted that the pawl pins 56, as previous set, still remain in the desired tooth on either side of the seat for the desired recline angle. For this example, the seat body 12 is shown in its maximum recline position, as in FIG. 13 and then going into ride down deceleration. Maximum ride down is shown in FIG. 15 where the sliding cassette 48 has moved completely forward in the amount of distance A, as seen in FIG. 8. At this point, the pin 36 in the slot 40 at the top of seat back 18 is at its rightmost position, namely at the top location of the slot 40.

Most importantly, the location of the slots and pins and the movement of the cassette 48, namely during ride down deceleration, the child's legs move forward, not their head, in such a force-inducing accident situation. This can be easily seen in FIG. 15. The present invention is unique due to this dynamic positioning of the child 70 in this situation. This is a significant advance over the prior art where load dampeners are provided at the belt harnesses or where the top of the seat is dampened and the seat pivots forward with the child's head thereby pivoting forward as well.

The ride down element 60 is a critical part of the present invention in that it controls the ride down deceleration. This element 60 can be in many different forms. For example, it can be a spring-like member (such as a coil spring or other configuration) that returns to its original position. In that case, after an accident, the seat body 12 would move back to its present reclined angle that it was set at before the accident.

Figure 18:
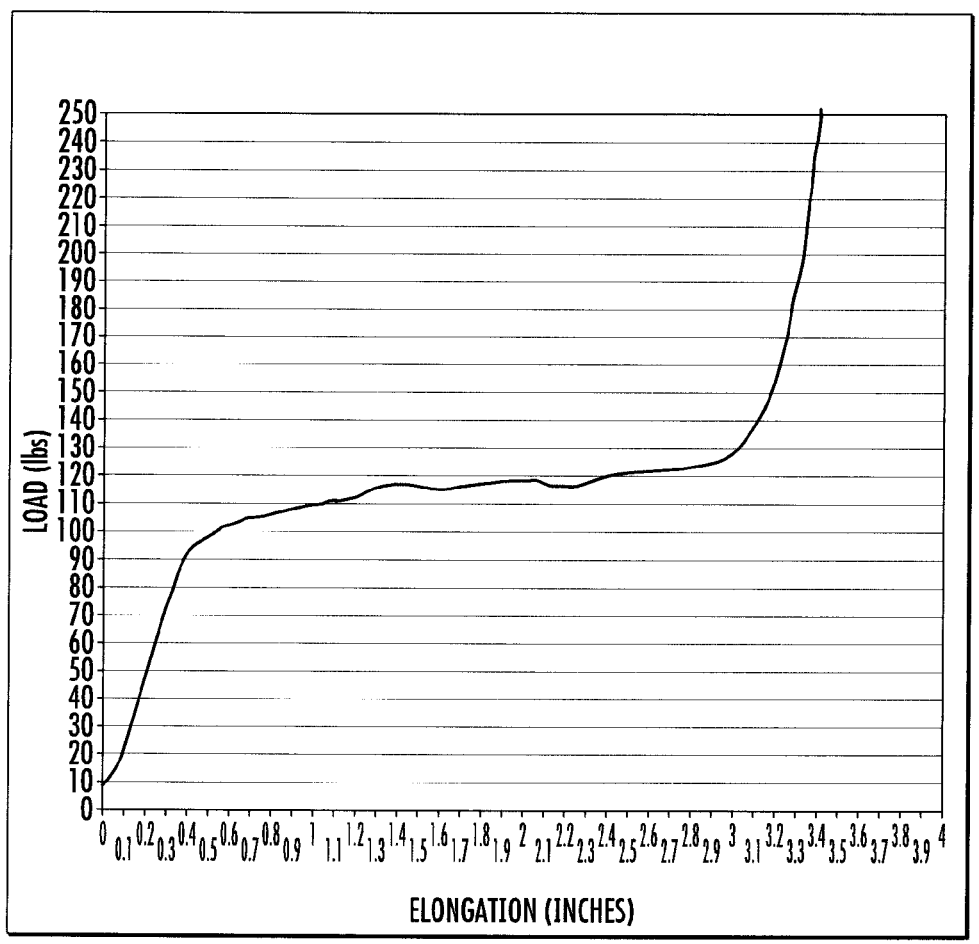
FIG. 18 is a graph illustrating the dampening capability of the dampening material for a given load at a given elongation.

However, it is preferred that the ride down element 60 be a load dampener or load limiter with a particular deceleration profile. It is preferred that such a ride down element 60 be partially oriented yarn (POY), as shown in FIGS. 16 and 17. The performance of such POY for load dampening and ride down is shown in the graph of FIG. 18. The POY material 60 is depicted in FIG. 16 in an at rest condition while FIG. 17 shows the POY material 60 in a stretched under-load condition. This material 60 can be selected to finely tune the ride down profile of a given seat 10 or even weight of the child 70. Such a material 60 may be a one-time use material where it would need to be replaced after a single traumatic use past a certain degree of extension. The advantages of such a ride down child car seat 10 is shown in the graph of FIG. 18. As can be seen in this example, a portion of the graph is, essentially, flat to indicate that the POY material 60 extends greatly after a certain load is reached. This is more desirable than a constant slope curve where the cassette 48 would also be moving. Instead, the POY profile of FIG. 18 shows the desirably condition where, essentially, a threshold load will need to be met before there will be any appreciable movement of the cassette 48 to effectuate ride down deceleration.

Control of the forward movement of the seat body 12 is the focus of the present invention while sill being able to provide recline angle adjustment of the overall child car seat 10. The present invention can use any type of material 60 as a load dampener to effectuate the ride down capability of the present invention while also providing the ability to adjust the recline angle of the child car seat 10.

In accordance with the present invention, there is a desire to track the movement of the seat 10, particularly after an accident or crash has occurred. In other words, it is very helpful for the person responsible for the seat 10, such as a parent, to be able to quickly and easily ascertain the status and condition of the seat 10, particularly after an accident and subsequent ride down of the seat 10 has occurred. This is important because, after an accident and ride down, the seat 10 is no longer usable because the elastic or spring member 60 (as best seen in FIG. 8) used to control and carry out the safe ride down of the seat 10 has been compromised as part of the ride down process. The crash indication system 100 provides a clear visual display of the condition of the seat 10 and the extent of ride down that has occurred, if any.

Figure 19:
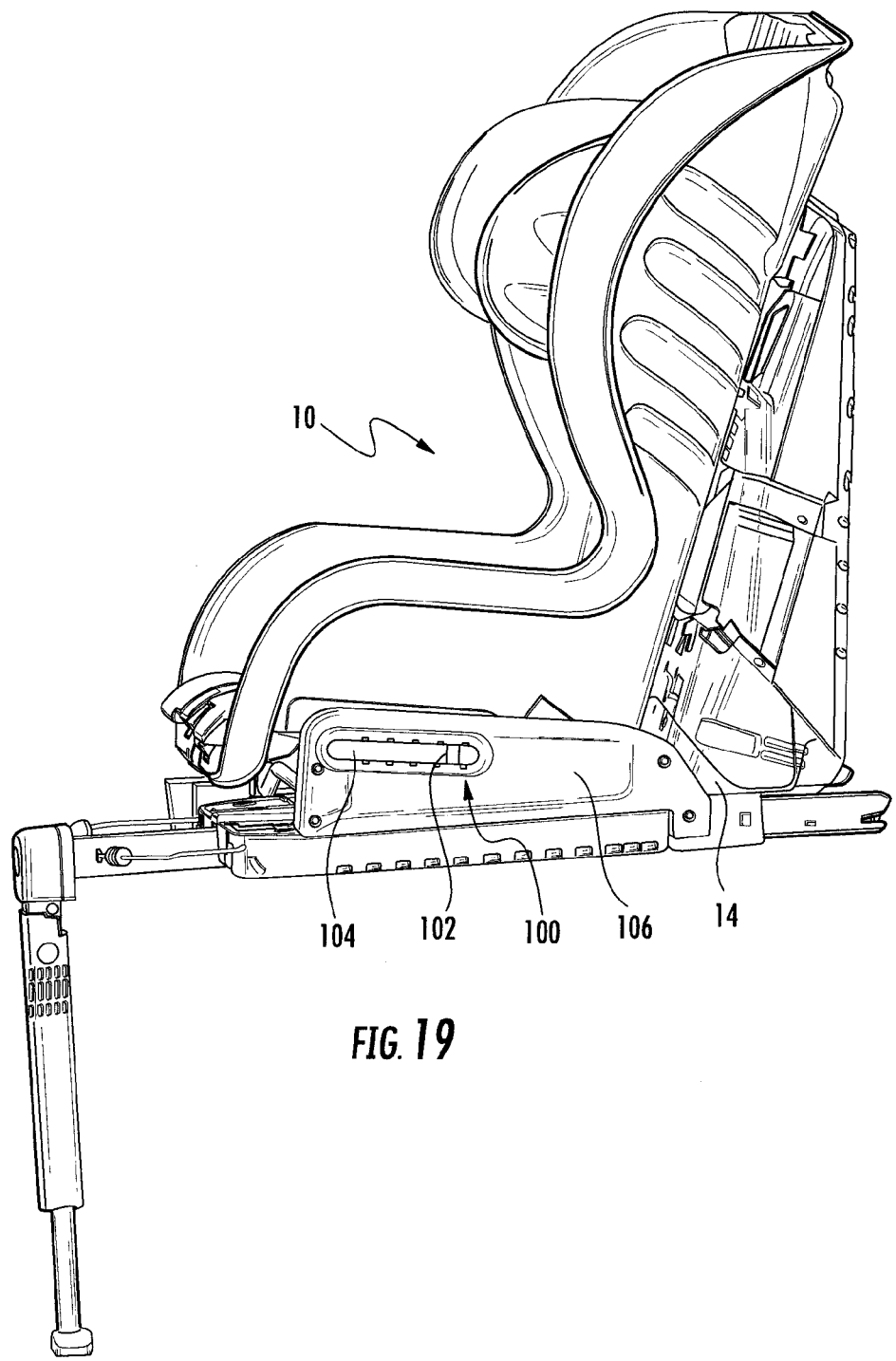
FIG. 19 is a side view of the ride down child car seat employing the crash indication system of the present invention.
Figure 20:
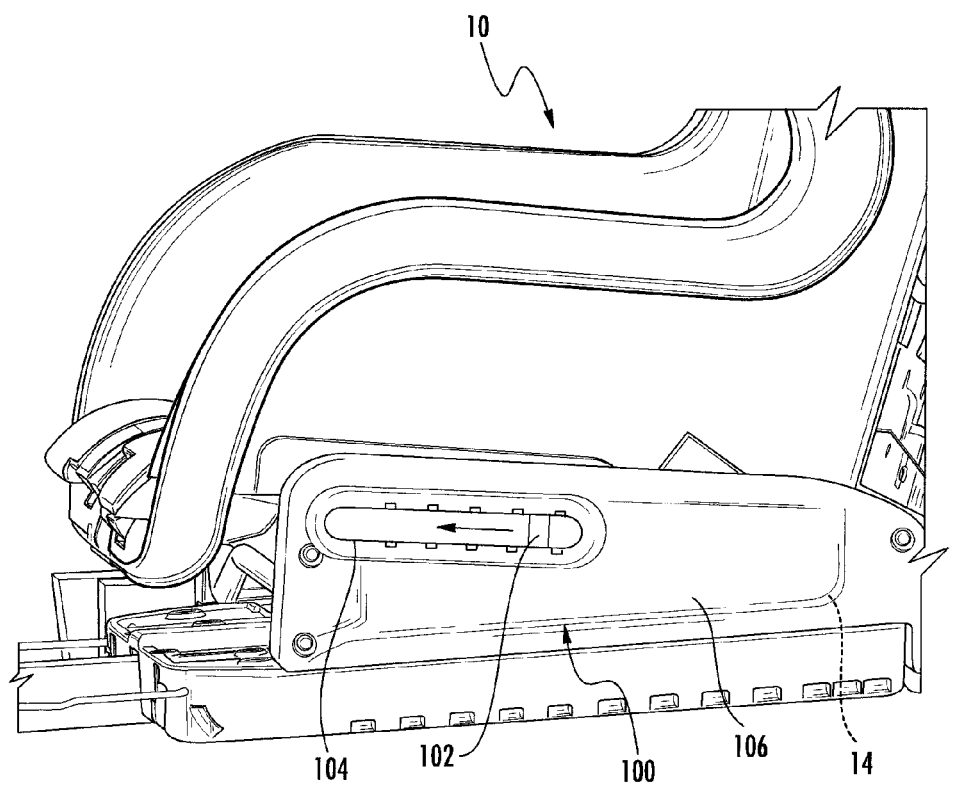
FIG. 20 is a close-up side view of the crash indication system of the present invention with base housing installed.

Referring to FIG. 19, a side view of the seat of FIGS. 1-15, is equipped with the crash indication system 100 of the present invention. In general, the crash indication system 100 includes an indicator member 102 that is visible through a window 104 in a housing 106 that covers the base 14. The window 104 may be of any configuration and may or may not include a clear view panel thereover. The indicator member 102 moves with the seat 10 upon ride down due to a crash or other impact that affects the forces on the seat 10. More specifically, as will be described below, the indicator member 102 is attached to the carriage 48 which carries the seat 10 and permits it to slide, against the forces of an elastic or spring member 60, upon ride down. When the carriage 48 moves, the indicator member 102 moves behind the housing 106 to provide a visual display through the housing 106. In FIGS. 19 and 20, the window 104 shows the indicator member 102 in a rearmost (rightmost) position, which is indicative of a seat 10 at rest and during normal use and not in a ride down condition. In this condition, the carriage 48 (not seen) is in a rearmost position, such as that seen in FIGS. 6 and 11.

Figure 21:
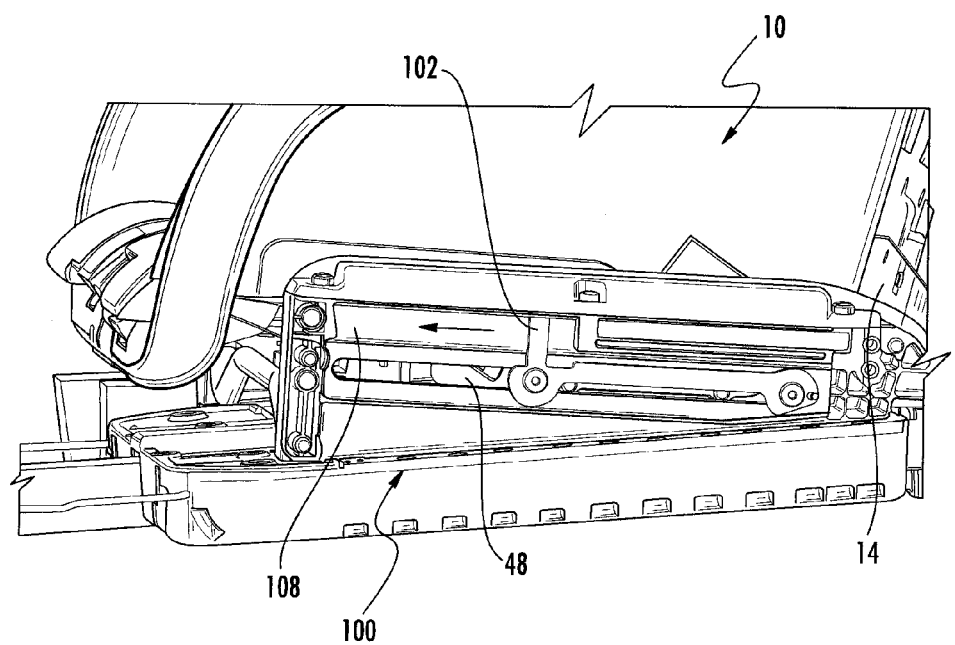
FIG. 21 is a close-up side view of the crash indication system of the present invention with the base housing removed for illustrative purposes.
Figure 22:
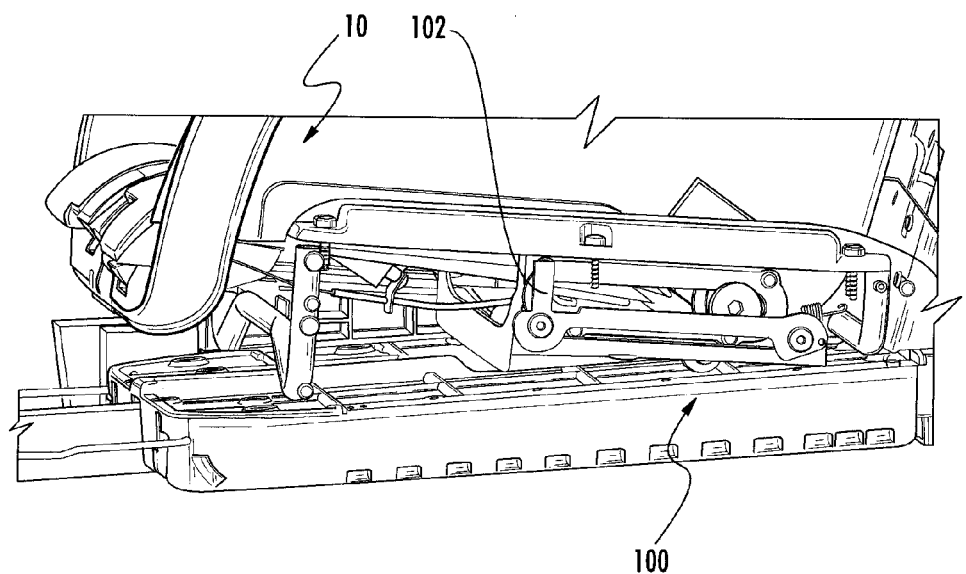
FIG. 22 is a close-up side view of the crash indication system of the present invention with a further panel removed for illustrative purposes.

Referring now to FIG. 21, a side view of the child car seat 10 of FIGS. 19 and 20 with the housing removed for illustrative purposes. Still further, FIG. 22 shows a side view thereof with a further internal panel 108 removed for illustrative purposes. As a result, the carriage member 48 and indictor member 102 can be clearly seen. The indicator member 102 is preferably connected to the outermost side of the carriage 48 so it can reside in the housing 106 and be visible from the outside. Thus, when the carriage 48 moves, so does the indicator member 102.

It is preferred that there are two indicator members 102 through corresponding housings 106 on opposing sides of the seat 102 so that the condition status of the seat 10 can be ascertained by looking at either side of the seat 10. Only one side of the seat 10 can be seen but it is envisioned that the opposite side would be a mirror image thereof. Also, it is possible to provide only one indicator member 102 one side of the seat 10.

Figure 23:
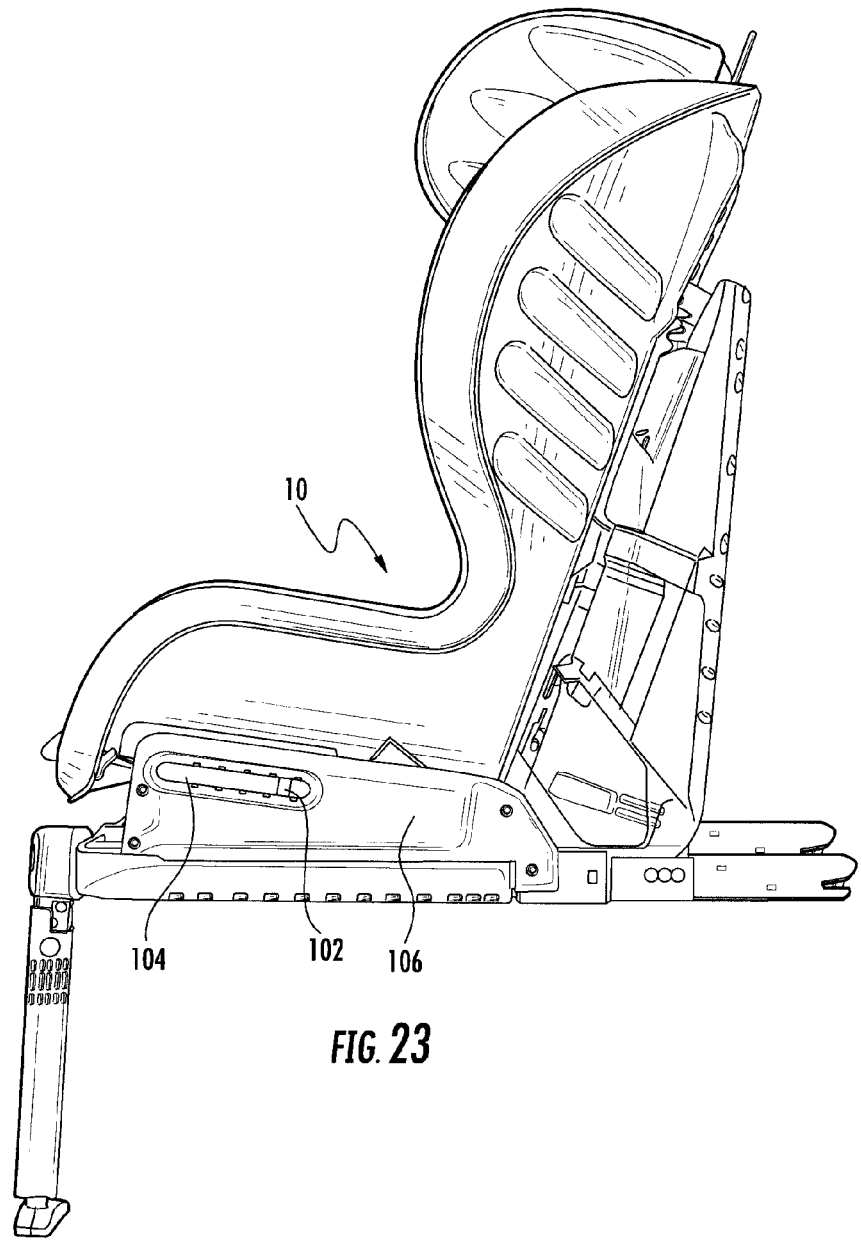
FIG. 23 is a side view of a ride down child car seat prior to a crash when the seat is in a upright recline position with the crash indicator in a position showing that the seat is operable and safe.
Figure 24:
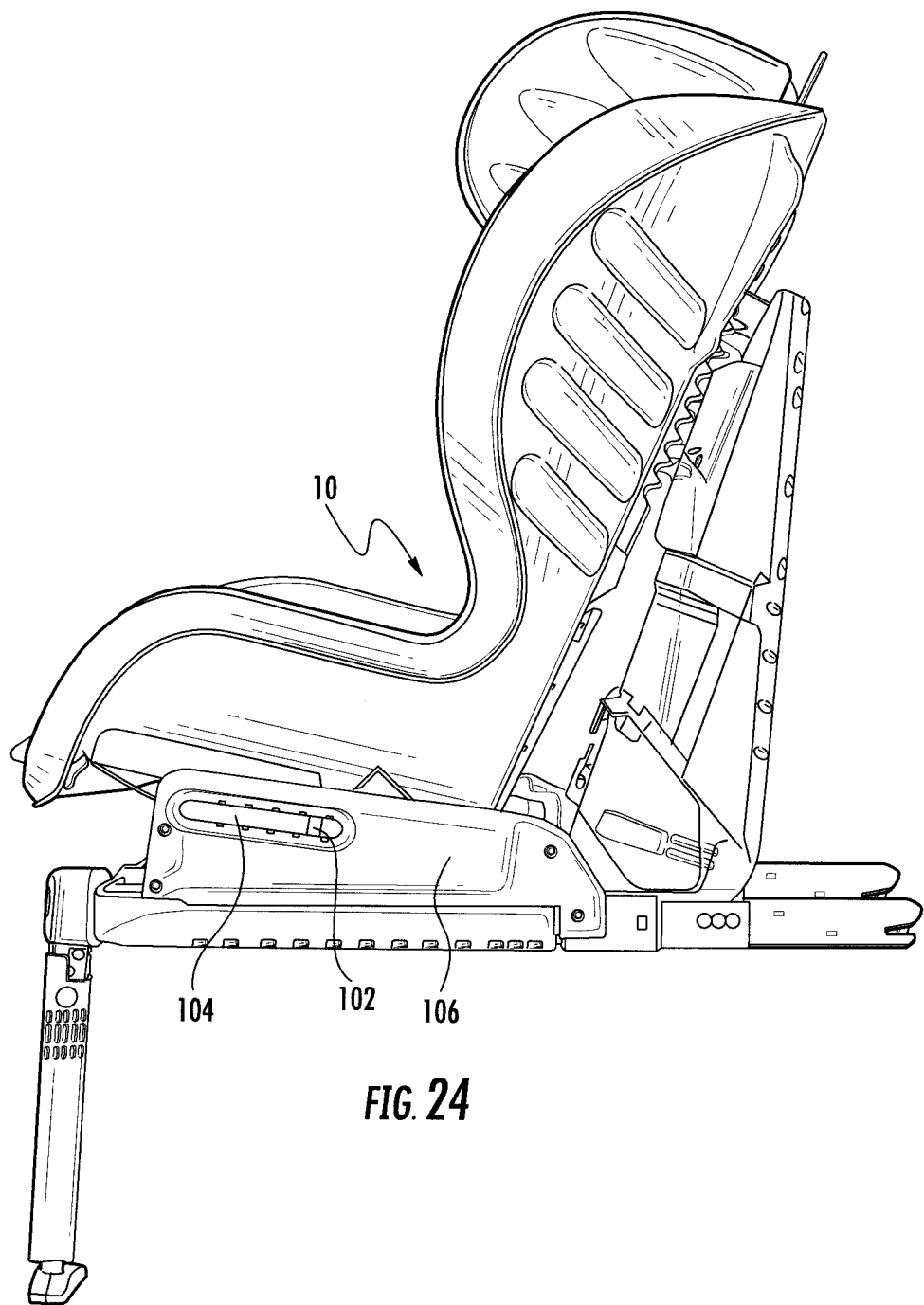
FIG. 24 is a side view of a ride down child car seat prior to a crash when the seat is in a middle recline position with the crash indicator in a position showing that the seat is operable and safe.
Figure 25:
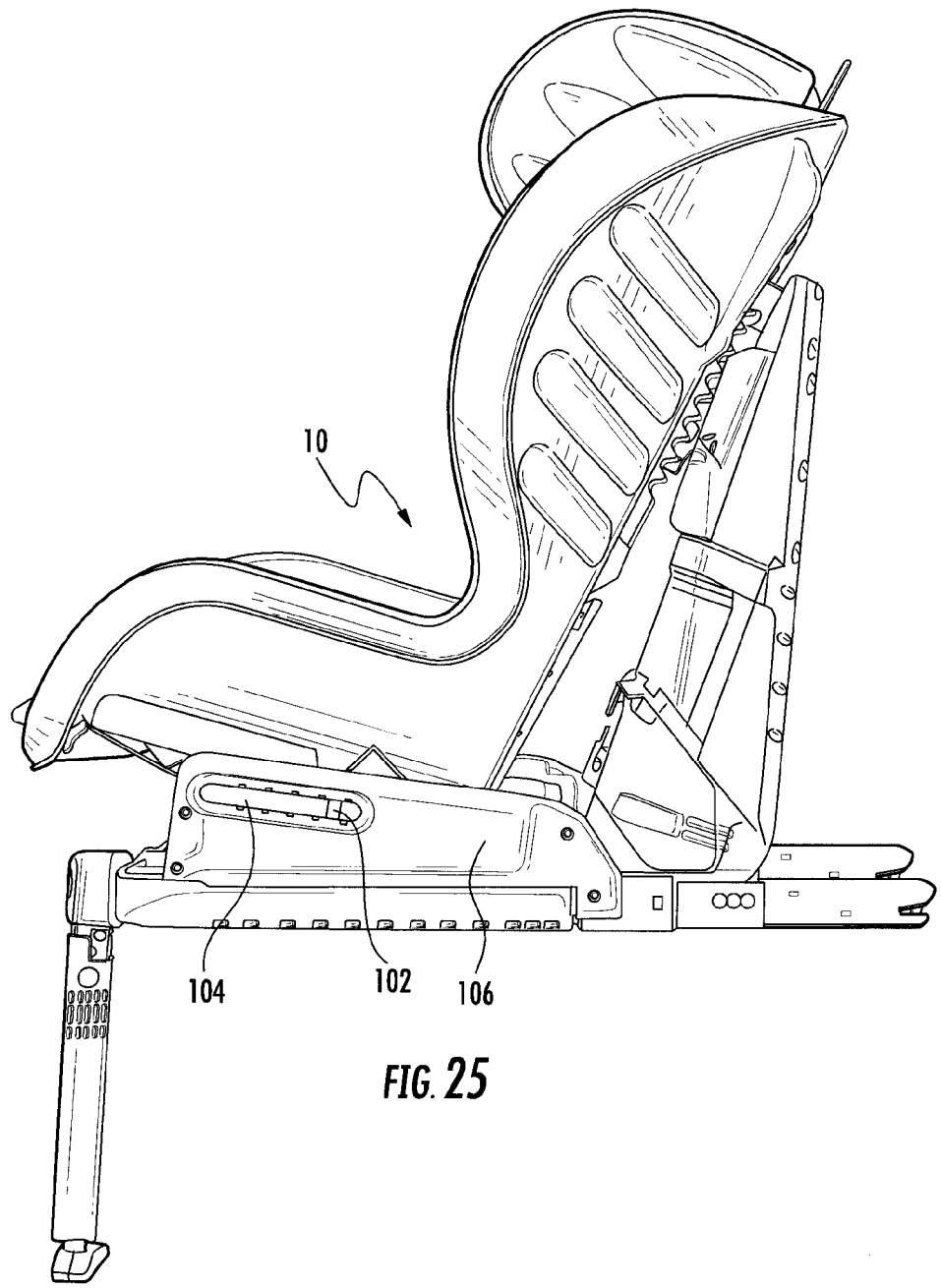
FIG. 25 is a side view of a ride down child car seat prior to a crash when the seat is in a fully reclined position with the crash indicator in a position showing that the seat is operable and safe.

The carriage member 48 adjustably carries the seat 10 for recline adjustment, which is described and shown in detail in connection with FIG. 10 above. FIG. 23 shows the seat 10 in an upright recline position. It should be noted that the indicator member 102 remains in a rearmost position because it is attached to the carriage 48, which remains in a rearmost condition with the assistance of the elastic or spring member 60. FIG. 24 shows further recline adjustment of the seat 10 but, as above, the indicator member 102 remains in the same location. Still further, FIG. 25 shows an even further recline adjustment to a maximum recline position with the indicator member 102 still remaining in its rearmost position. After the recline of the seat 10 is set as desired, it is used in the normal course. During this normal use, the indicator member 102 remains located in the rearmost position, as seen in FIGS. 23-25.

In accordance with the present invention, the indicator member 102 moves forward (toward the left in the figures) upon ride down of the seat 10 due to a crash or other event that imparts sufficient forces to the seat 10. FIGS. 26-29 illustrate the movement of the indicator member 102 of the crash indication system 100 of the present invention to reflect the status of the condition of the seat 10 after a crash event. It should be noted that the seat 10 seen in FIGS. 26-29 is in the most upright recline position.

Figure 26:
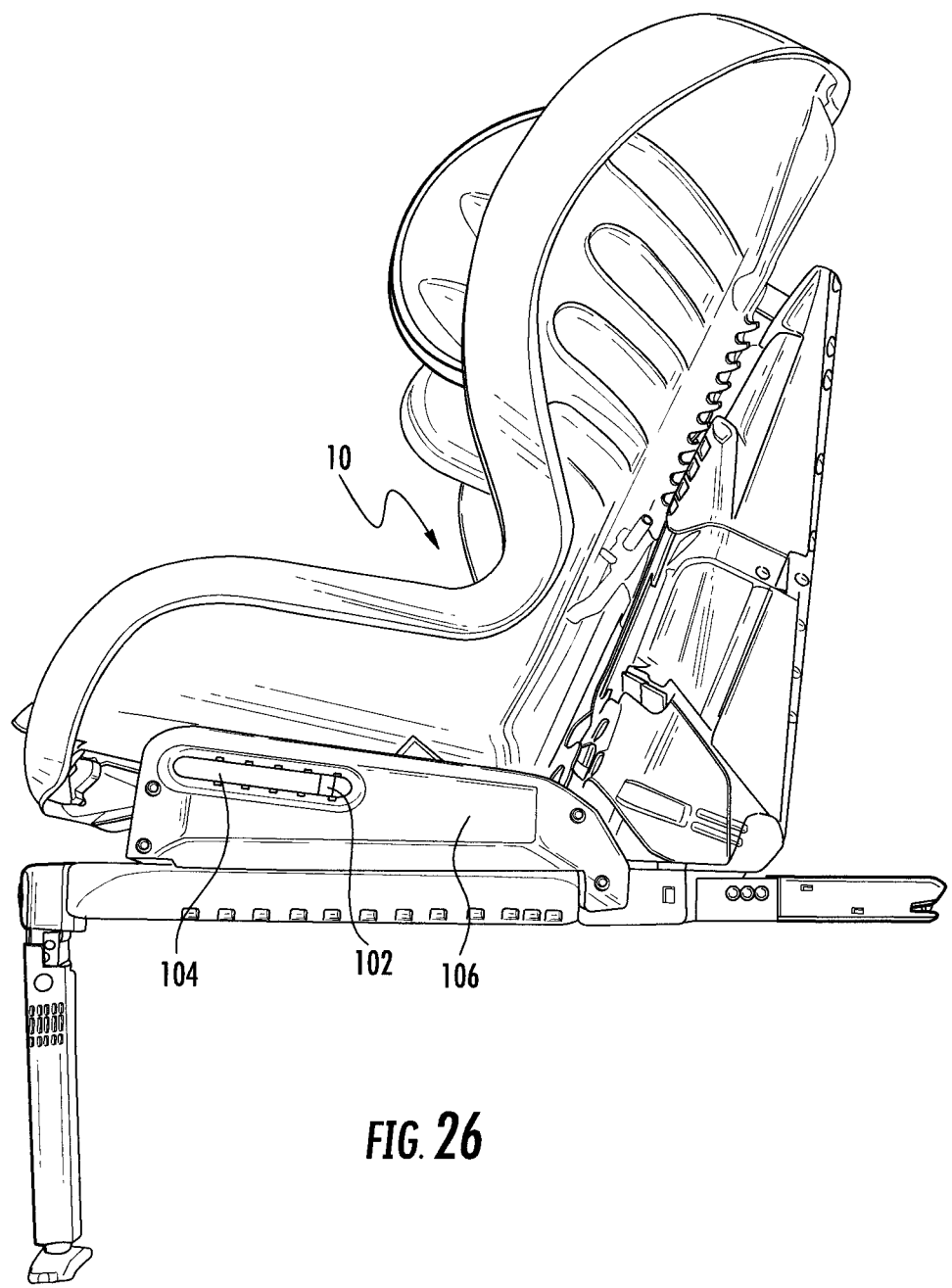
FIG. 26 is a side view of the ride down child car seat first experiencing a crash and starting the ride down process with the crash indicator starting to move forward.
Figure 27:
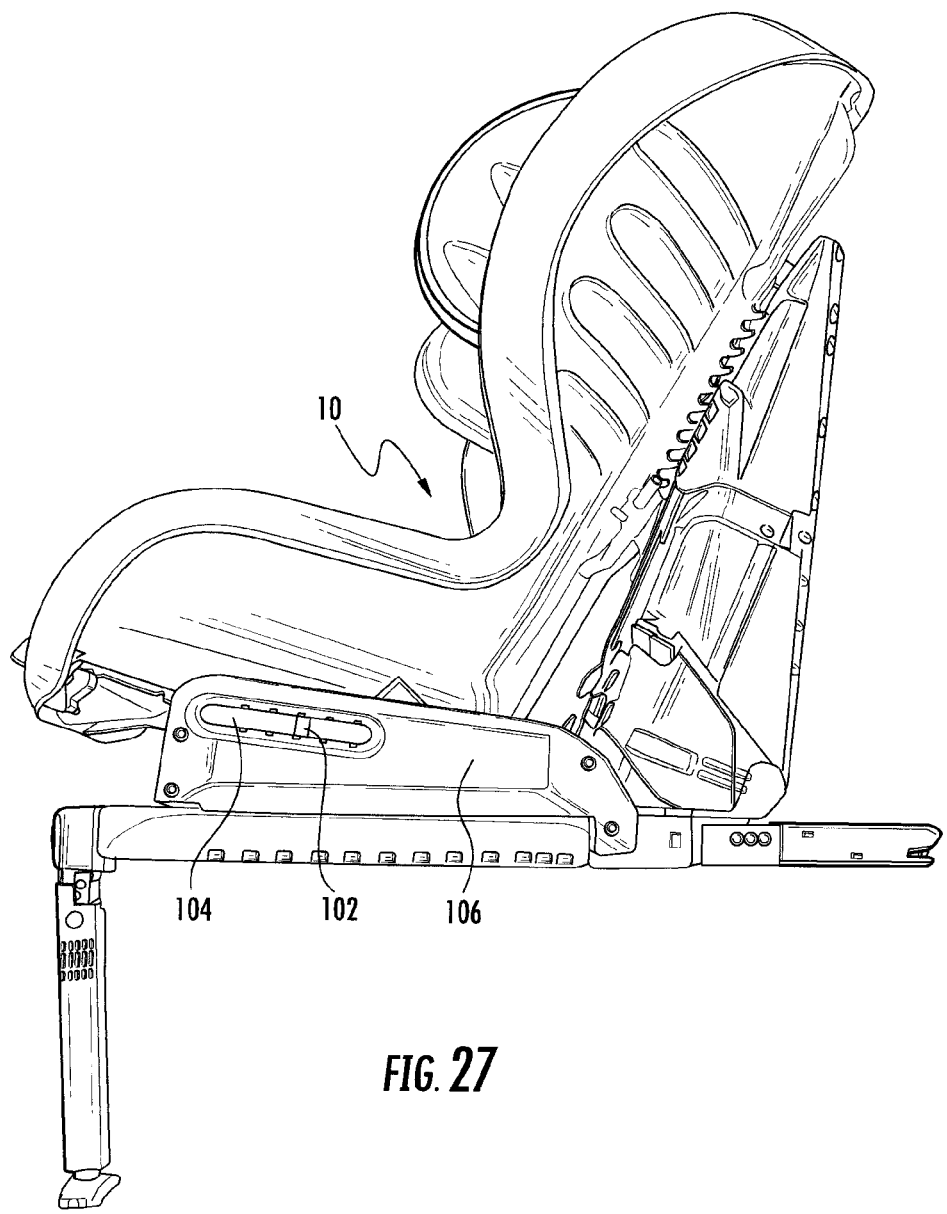
FIG. 27 is a side view of the ride down child car seat in the middle of experiencing a crash and executing the ride down process with the crash indicator moving more forward.

FIG. 26 shows the start of the ride down process due to forces applied to the seat 10, such as from an accident. It can be seen that the indicator member 102 is just starting to move forward (to the left in the figures). This corresponds with the forward sliding movement of the carriage 48 against the forces of the elastic ride down member 60. It is possible that the extent of the outside forces applied to the seat 10 from an accident are only enough to move the carriage 48 forward slightly so that the indicator member 102 only reaches to a position shown in FIG. 27. As will be described below in connection with FIG. 30 below, the carriage 48 and indicator member 102 attached thereto will remain at the position seen in FIG. 27. Thus, after the accident, it can be plainly seen that a ride down condition has occurred. Also, the relative position of the indicator member 102 through the travel of the window 104 indicates a certain level of outside forces that have been applied to the seat 10.

Figure 28:
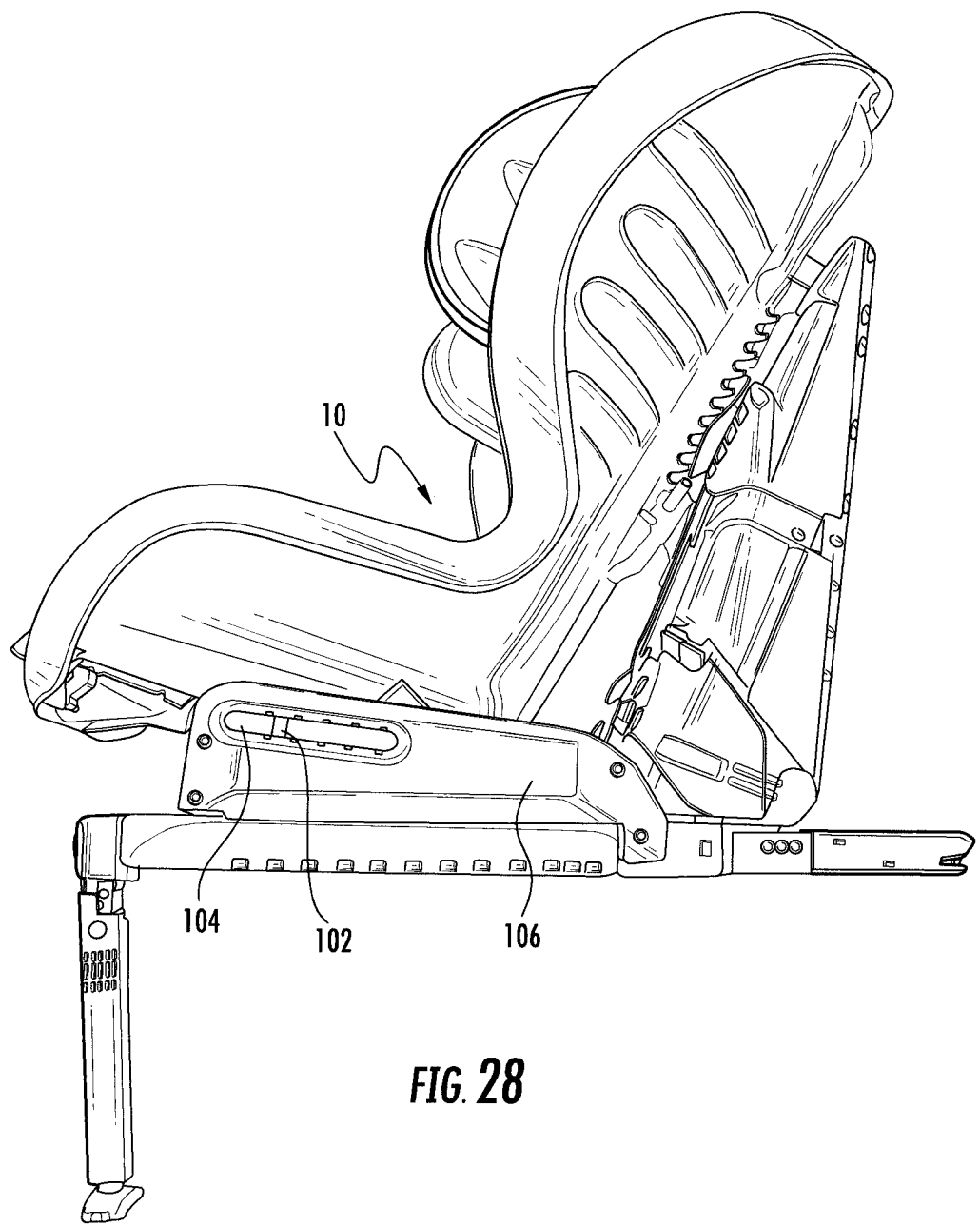
FIG. 28 is a side view of the ride down child car seat further experiencing a crash and continuing to execute the ride down process with the crash indicator moving even more forward.

Turning now to FIG. 28, a condition of the seat 10 is shown that is experiencing further and perhaps greater outside forces during an accident resulting in a higher degree of ride down, namely, further forward travel of the seat 10 forward thus causing a corresponding forward movement of the carriage 48 (attached to the elastic element) and indicator member 102 attached thereto. Therefore, it can be seen that the indicator member 102 is located further forward compared to the position shown in FIG. 27. As above, the carriage 48 and indicator member 102 remain in position even after the outside forces from an accident have ceased.

Figure 29:
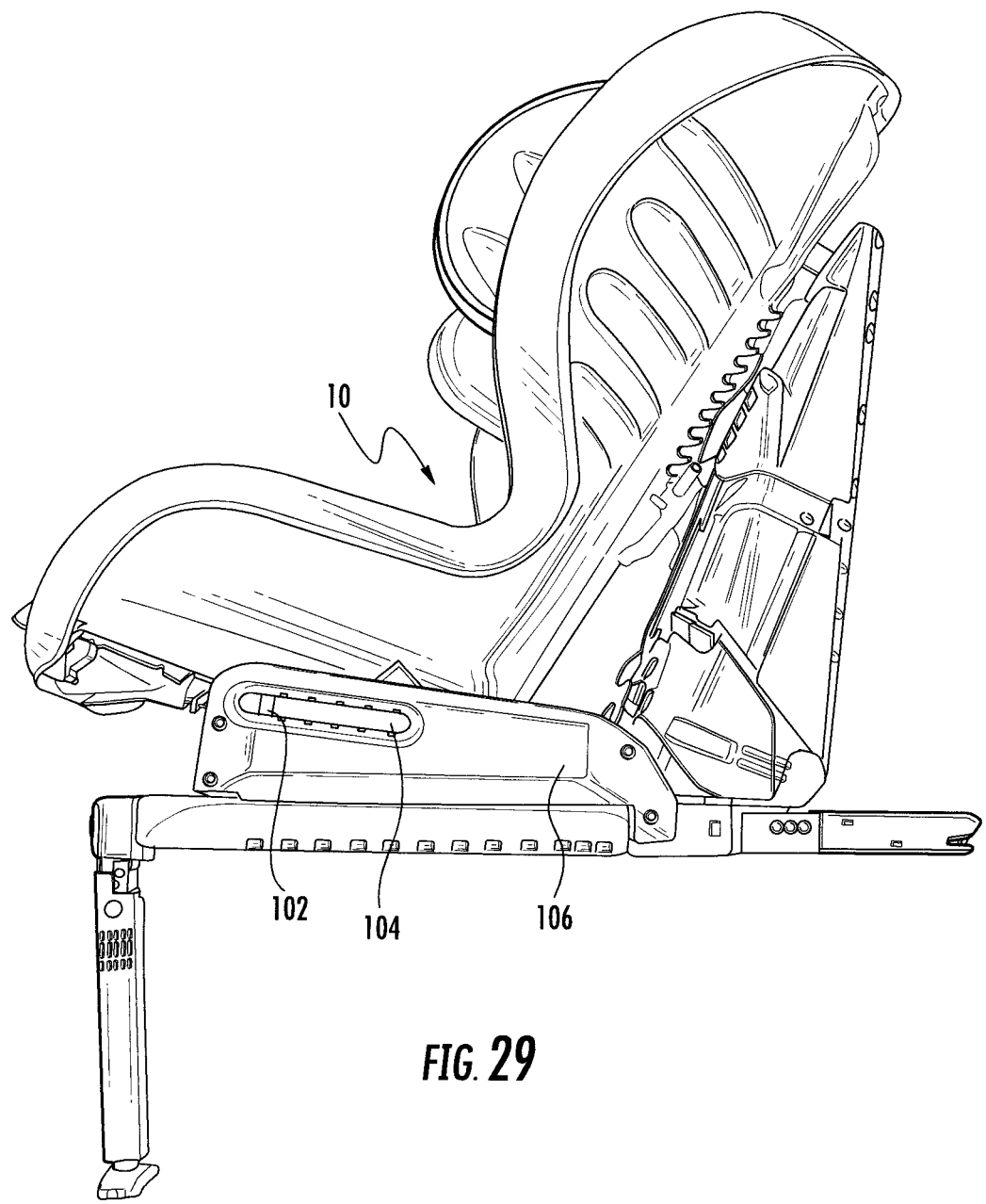
FIG. 29 is a side view of the ride down child car seat further experiencing the a crash and completing the ride down process with the crash indicator located to its forwardmost position.

FIG. 29 shows even further and greater forces applied to the seat 10 causing full ride down, namely, forward movement of the seat 10, the carriage member 48 and indicator member 102 attached thereto. As a result, the indicator member 102 is located in a forwardmost position at the front end of the window 104. This condition represents a larger force applied to the seat 10 and resultant ride down compared to the conditions set forth in connection with FIGS. 27 and 28 above. As above, the indicator member 102 in FIG. 29 remains in the shown position to provide visual evidence of the condition of the seat 10 after a crash and corresponding ride down of the seat 10.

Figure 30:
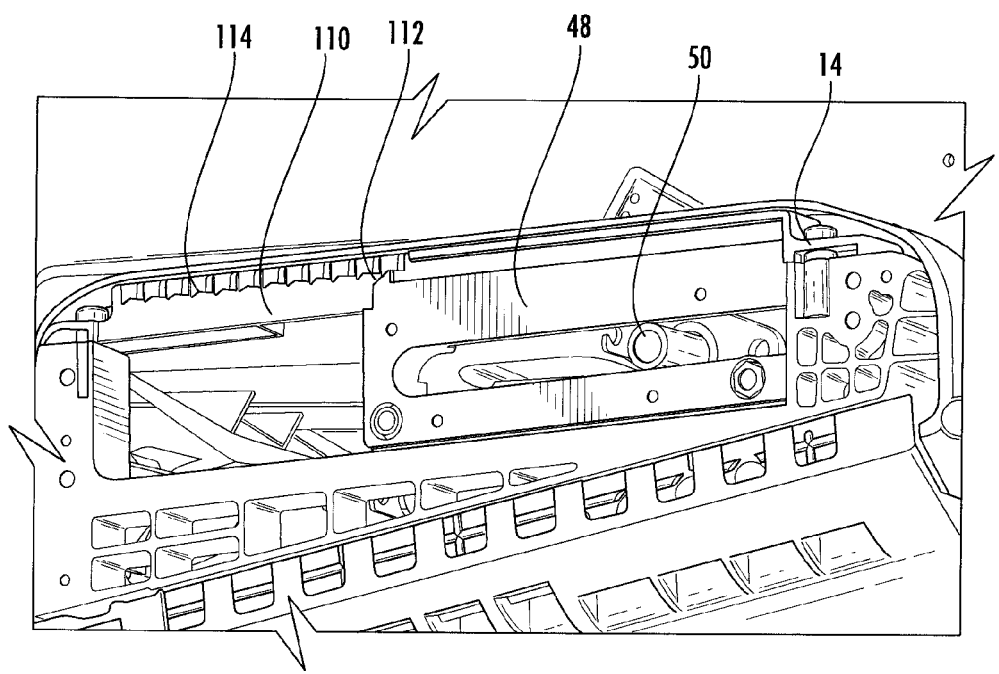
FIG. 30 is a side view of the crash indication system showing a tooth and ratchet system for retaining the forwardmost position of the crash indicator after a crash and ride down of the seat has occurred.

Referring now to FIG. 30, a preferred embodiment of the crash indication system 100 for maintaining the carriage 48, and indicator member 102 attached thereto, in the forwardmost position that it has reached during ride down. In FIG. 30, the indicator member 102 is not shown for illustrative purposes but it should be understood that the indicator member 102 is attached to and moves with the carriage 48, as in FIGS. 21 and 22. The carriage 48 slides within a slot 110 in the base 14 with the seat 10 connected thereto by the recline adjustment rod 50. A tooth 112 is provided on the carriage 48 to engage with notches 114 on the base. The tooth 112 and the notches 114 are configured so that forward movement (to the left in FIG. 30) is permitted but once the tooth 112 engages with a notch of the notches 114, movement rearwardly (to the right in FIG. 30) is no longer possible.

In operation, an outside force is imparted to the seat 10 during an accident and it begins to slide forward against the forces of the elastic ride down member 60. As above, the ride down member 60 dampens the forces applied to the seat 10 (and to the occupant) as the carriage 48, and seat 10 attached thereto, moves in a forward direction. After there has been forward movement of the carriage 48 (and seat 10) and the outside forces have ceased, the tooth 112 attached to the carriage 48 remains engaged with a notch of the notches 114 on the base 14 thereby preventing movement of the carriage 48 and the seat 10 in a rearward direction. Thus, the seat 10, carriage 48 and indicator member 102 attached thereto remain in a location that is more forward (leftward in the figures) than the normal rearmost (rightmost) position of FIG. 19. Any such forward (leftward) location of the indicator member 102 indicates that there has been some amount of ride down of the seat 10 and use of the elastic ride down member 60 therein. This is further indicative that the seat 10 has been compromised due to the ride down process being carried out thereby necessitating replacement of the seat 10.

It should be understood that the crash indication system 100 can be carried out in many different way using different physical configurations. As in FIG. 22, for example the indicator member 102 is connected to the side of the carriage 48, however, is possible that it could be attached to another location on the carriage 48. Also, the indicator member 102 is shown as a tab emanating upwardly from a transverse plate attached to the carriage 48. This construction may be modified, as desired, to change the change the shape and size of the indicator member 102. In fact, the indicator member could even be a section or portion of the carriage 48 itself that is visible from the outside of the seat 10. In sum, the indicator member 102 is any structure that is visible from the outside of the seat 10 that moves with the carriage 48 during ride down.

It should also be noted that any of the components of the seat 10 of the present invention may be made out of any suitable material, such as plastic and metal. These components may be molded, cast or otherwise formed to achieve the required configuration and shape.

It would be appreciated by those skilled in the art that various changes and modifications can be made to the illustrated embodiments without departing from the spirit of the present invention.

What is claimed is:

1. A crash indication system for a child safety seat, comprising:
   a seat body having a seat bottom;
   a base for supporting the seat body;
   the seat bottom being slidably connected to the base;
   the seat body being movable relative to the base, between a resting position and a ride down position, defined as a position in which there has been a resulting change in location of the seat bottom caused by a change in forces to the seat;
   a carriage slidably connected to the base; the carriage including a plurality of notches therein;
   a rod connected to the seat bottom of the seat body; the rod being selectively placeable in one of the plurality of notches; and
   whereby location of the rod in one of the plurality of notches sets a recline position for the seat body in a resting position;
   an indicator member attached to the carriage and movable therewith to track and monitor the movement of the seat; and
   whereby, upon ride down of the seat in the event of the change in forces to the seat, the indicator member moves with the carriage to reflect a ride down position of the seat bottom.

2. The crash indication system for a child safety seat of claim 1, further comprising:
   a housing positioned over the base and defining a window therethrough; the indicator member moving with the seat bottom upon ride down of the seat and being visible through the housing during ride down of the seat.

3. The crash indication system for a child safety seat of claim 1, further comprising:
   means for preventing the seat body from returning back to its initial resting position from its ride down position.

4. The crash indication system for a child safety seat of claim 3, wherein the means for preventing is a ratchet interconnection between the seat bottom and the base.

* * * * *